United States Patent
Knowles et al.

(10) Patent No.: US 8,080,699 B2
(45) Date of Patent: Dec. 20, 2011

(54) TWO-STAGE PROCESS AND SYSTEM FOR FORMING HIGH VISCOSITY POLYALPHAOLEFINS

(75) Inventors: Daniel C. Knowles, Southbury, CT (US); Jesus R. Fabian, Wethersfield, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/549,559

(22) Filed: Aug. 28, 2009

(65) Prior Publication Data

US 2011/0054126 A1 Mar. 3, 2011

(51) Int. Cl.
*C07C 2/02* (2006.01)
*C07C 2/04* (2006.01)

(52) U.S. Cl. ......... 585/517; 585/510; 585/520; 585/522

(58) Field of Classification Search .................. 526/65; 585/12, 312, 313, 324, 326, 517
See application file for complete search history.

(56) References Cited

U.S. PATENT DOCUMENTS

| | | |
|---|---|---|
| 3,087,936 A | 4/1963 | Le Suer |
| 3,185,704 A | 5/1965 | Kahn et al. |
| 3,254,025 A | 5/1966 | Le Suer |
| 3,442,808 A | 5/1969 | Traise et al. |
| 3,632,511 A | 1/1972 | Chien-Wei Liao |
| 3,732,198 A | 5/1973 | Whiteley et al. |
| 3,862,257 A | 1/1975 | Buben et al. |
| 4,045,507 A * | 8/1977 | Cupples et al. ............... 585/511 |
| 4,107,413 A | 8/1978 | Giannini et al. |
| 4,182,922 A * | 1/1980 | Schick et al. .................... 585/18 |
| 4,294,721 A | 10/1981 | Cecchin et al. |
| 4,438,238 A * | 3/1984 | Fukushima et al. .......... 525/240 |
| 4,469,910 A * | 9/1984 | Loveless ........................ 585/511 |
| 4,579,675 A | 4/1986 | Sawicki et al. |
| 4,663,064 A | 5/1987 | Nalesnik et al. |
| 4,686,054 A | 8/1987 | Wisotsky et al. |
| 4,748,221 A | 5/1988 | Collomb et al. |
| 4,822,945 A * | 4/1989 | Bronstert et al. ............. 585/517 |
| 4,839,071 A | 6/1989 | Gutierrez et al. |
| 4,839,072 A | 6/1989 | Gutierrez et al. |
| 5,026,495 A | 6/1991 | Emert et al. |
| 5,085,788 A | 2/1992 | Emert et al. |
| 5,229,478 A | 7/1993 | Floyd et al. |
| 5,259,906 A | 11/1993 | Poplawski et al. |
| 5,326,835 A * | 7/1994 | Ahvenainen et al. ........... 526/64 |
| 5,328,622 A | 7/1994 | Emert et al. |
| 5,334,321 A | 8/1994 | Harrison et al. |
| 5,356,552 A | 10/1994 | Harrison et al. |
| 5,385,991 A * | 1/1995 | Yamaguchi et al. ............ 526/74 |

(Continued)

FOREIGN PATENT DOCUMENTS

EP 0517868 T1 * 7/1993

(Continued)

*Primary Examiner* — David W Wu
*Assistant Examiner* — Elizabeth Eng
(74) *Attorney, Agent, or Firm* — Joseph Suhadolnik

(57) ABSTRACT

A final polymer product is formed using a two-stage process and system. In the first stage, a catalyst system is used to polymerize an alpha-olefin monomer to form an effluent. In the second stage, additional alpha-olefin monomer is supplied and is polymerized in the presence of the effluent from the first stage. The second stage produces the final polymer product, which may have a lower molecular weight and viscosity than the polymer formed in the first stage. The final polymer product may be used as a base stock for lubricant compositions.

32 Claims, 8 Drawing Sheets

U.S. PATENT DOCUMENTS

| | | | |
|---|---|---|---|
| 5,407,591 A | | 4/1995 | Emert et al. |
| 5,589,539 A | * | 12/1996 | Wagner et al. .................. 525/53 |
| 5,693,719 A | * | 12/1997 | Goto et al. ..................... 525/324 |
| 5,716,912 A | | 2/1998 | Harrison et al. |
| 5,739,226 A | | 4/1998 | Spitz et al. |
| 5,849,676 A | | 12/1998 | Harrison et al. |
| 5,861,363 A | | 1/1999 | Willis, Jr. et al. |
| 6,060,572 A | | 5/2000 | Gillis et al. |
| 6,194,520 B1 | * | 2/2001 | Cheruvu et al. .............. 525/240 |
| 6,225,427 B1 | | 5/2001 | Burton et al. |
| 6,713,582 B2 | | 3/2004 | DiMaio et al. |
| 6,858,767 B1 | | 2/2005 | DiMaio et al. |
| 7,129,306 B2 | | 10/2006 | DiMaio |
| 7,145,038 B1 | | 12/2006 | Hobbs |
| 7,229,951 B2 | | 6/2007 | Migdal et al. |
| 7,329,772 B2 | | 2/2008 | Baranski |
| 7,375,061 B2 | | 5/2008 | Duyck et al. |
| 7,390,928 B2 | | 6/2008 | Hobbs et al. |
| 2007/0032618 A1 | * | 2/2007 | Varzeshkhah et al. ..... 526/124.3 |
| 2008/0053873 A1 | | 3/2008 | Kosover et al. |

FOREIGN PATENT DOCUMENTS

| | | |
|---|---|---|
| WO | WO 2008/030387 A2 | 3/2008 |

* cited by examiner

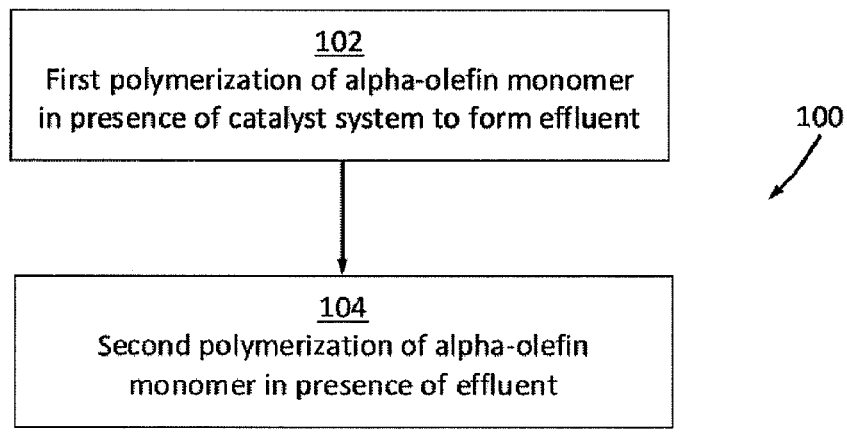
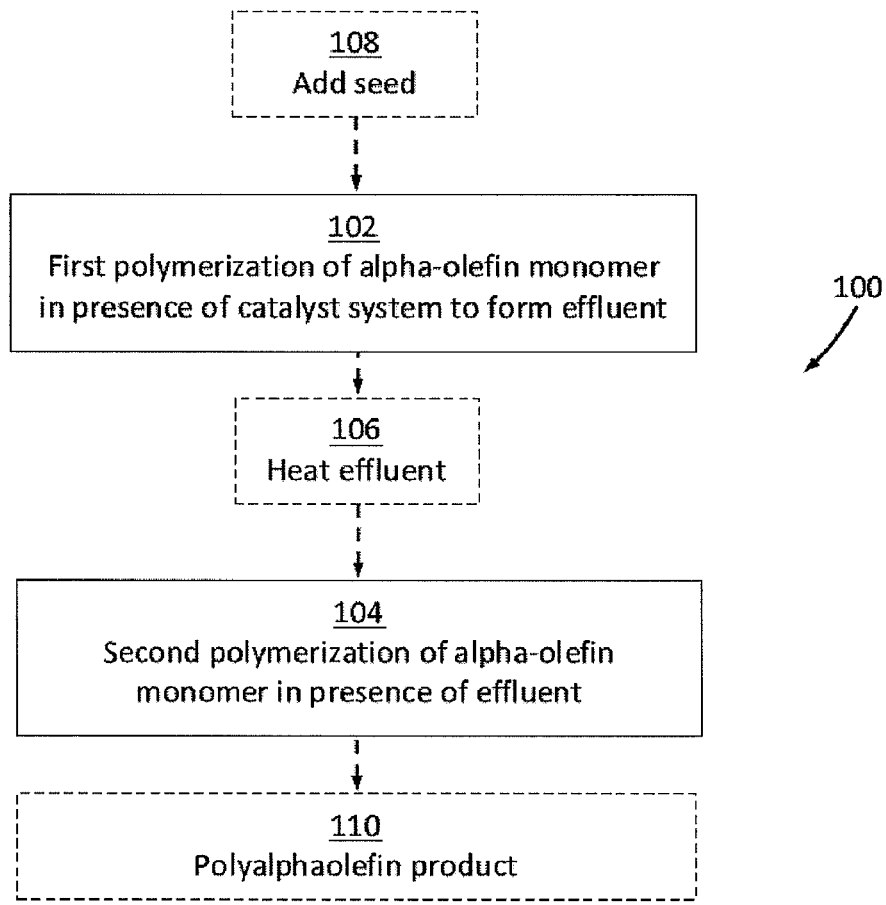

TWO-STAGE PROCESS AND SYSTEM FOR FORMING HIGH VISCOSITY POLYALPHAOLEFINS

FIELD OF THE INVENTION

This invention relates to polyalphaolefins and more particularly to systems and methods for producing high viscosity polyalphaolefins.

BACKGROUND OF THE INVENTION

Efforts to improve upon the performance of natural mineral oil based lubricants by the synthesis of oligomeric hydrocarbon fluids have been the subject of important research and development in the petroleum industry for several decades. To achieve increased extended drain intervals, resistance to thermal and oxidative degradation, lower oil consumption, low volatility, and greater total base number (TBN) retention, engine lubricant formulations have evolved from mineral based oils (API Group I) to synthetic base oils, such as high viscosity polyalphaolefins (PAO) (API Group IV). PAOs have several advantages over mineral based oils, such as narrow boiling ranges, low pour points, and high viscosity indexes for all grades having a kinematic viscosity at 100° C. of 4 cSt ($mm^2/s$) or greater. Formulated PAO base stocks, sometimes combined with additives, offer excellent performance over a wide range of lubricating properties. The advantages of PAO base stocks have lead to an increased use of PAO in several different applications as synthetic lubricants for greases, automotive lubricants, marine lubricants, aerospace lubricants, automotive oils, transmission oils, industrial gear oils, circulating oils, turbine oils, extreme pressure gear oils, refrigeration compressor lubricants, air compressor oils, and hydraulic fluids. The amount of PAO produced to meet the demand for these applications continues to increase.

Catalytic oligomerization of alpha-olefin monomer (α-monomer) is a known technique for manufacturing PAO base stocks useful as lubricants. PAOs are formed from α-monomer or a mixture of α-monomers containing from 2 to 20 carbon atoms. Typically a catalyst system, such as a Ziegler-Natta catalyst of the triethylaluminum/titanium tetrachloride type, alkyl-aluminum halide-alkoxide-zirconium halide type or a boron trifluoride-base Friedel-Craft, is used to polymerize the α-monomer.

U.S. Publication No. 2007/0225534 discloses a method of making a PAO using tetradecene and particularly mixtures comprising 1-hexene, 1-decene, 1-dodecene, and 1-tetradecene, characterized by a low viscosity, kinematic viscosity at 100° C. of from about 4 to about 12 cSt, and excellent cold temperature properties, using a promoter system comprising an alcohol and an ester. This reaction may be carried out continuously in one continuously-stirred tank reactor or in a series of at least two continuously-stirred tank reactors.

U.S. Pat. No. 4,469,910 discloses a process for oligomerizing alpha-olefin monomers comprising contacting in a reaction zone under reaction conditions: (a) alpha-olefin monomers having at least three carbon atoms; (b) an aluminum compound having the formula $R_3Al$, wherein R is an hydrocarbyl group and (c) a cocatalyst which is hydrocarbyl halide having at least one halogen group reactive with said aluminum compound, elemental bromine or elemental iodine.

A significant problem in the manufacture of synthetic lubricants is the difficulty in producing lubricants of a preferred high viscosity range in good yield without excessive catalyst deactivation. It is difficult to directly produce higher viscosity range lubricants without incurring lower yields due to the production of non-lubricant range materials. Thus, methods to control molecular weight of lubricants in the oligomerization step are sought after in the art to overcome the problems in the manufacture of, particularly, higher viscosity lubricants. Continued improvement in the production of PAO is needed with greater efficiencies and lower costs.

SUMMARY OF THE INVENTION

The invention is directed to reaction systems and processes for forming polyalphaolefin (PAO), e.g., polydecene, in high yield while having the ability to control viscosity and molecular weight of the resulting PAO. The systems and processes employ two reaction zones for forming the PAO.

In a first embodiment, the invention is to a process for forming a final polymer product comprising: (a) polymerizing a first olefin monomer in a first reaction zone in the presence of a catalyst system comprising a catalyst to foam an effluent comprising a first polymer having a first viscosity and activated catalyst; and (b) polymerizing a second olefin monomer in a second reaction zone in the presence of the first polymer and the catalyst to form the final polymer product having a second viscosity. The first viscosity preferably is greater than the second viscosity. The process may be a continuous process or a batch process. The process preferably further comprises the step of directing the first effluent or a portion thereof from the first reaction zone to the second reaction zone.

Optionally, the process further comprises the step of loading a seed composition to the first reaction zone to activate the catalyst. The process may also comprise the step of polymerizing at least a portion of the first polymer in the second reaction zone in the presence of the activated catalyst.

In another embodiment, the invention is to a reaction system for forming PAO. For example, in one embodiment, the invention is to a system for forming a final polymer product comprising: (a) a first reaction zone configured to polymerize a first olefin monomer in the presence of a catalyst system to form an effluent comprising a first polymer having a first viscosity and an activated catalyst of the catalyst system; and (b) a second reaction zone configured to receive the effluent (or an portion thereof, e.g., an aliquot portion thereof) from the first reaction zone and polymerize the second olefin monomer in the presence of the activated catalyst of the effluent to form a final polymer product having a second viscosity, wherein the first reaction zone is in fluid communication with the second reaction zone. The second reaction zone preferably is configured to receive the second olefin monomer from a source that is the same source as the first olefin monomer. Ideally, the second reaction zone is configured to receive substantially no catalyst system from any source other than from the effluent from the first reaction zone.

According to preferred embodiments of the invention, in either the process or the reaction system, the first olefin monomer and the second olefin monomer comprise alpha-olefin monomers having from 2 to 20 carbon atoms, e.g., most preferably 1-decene. The first olefin monomer and the second olefin monomer may have the same or different compositions. The molar ratio of the first olefin monomer to the second olefin monomer optionally is from 4:1 to 1:4.

The first polymer preferably has a weight average molecular weight of from 500 to 10,000. Since monomer is added to the second reaction zone, the final polymer product may have a lower weight average molecular weight, e.g., from 500 to 8,000. In one aspect, the final polymer product has a weight average molecular weight that is at least 50% less than the first polymer.

Similarly, the first polymer may have a viscosity that is greater than that of the final polymer product. For example, the first polymer preferably has a viscosity of from 20 to 500 cSt, and the final polymer product optionally has a viscosity of from 20 to 60 cSt or, alternatively, the final polymer product may have a viscosity of from 70 to 140 cSt. Although the first viscosity preferably is greater than the first viscosity, it is also contemplated that in other embodiments, the first viscosity may be substantially equal to or less than the second viscosity.

Conditions in the first and second reaction zones may vary. For example, the first reaction zone optionally is heated to a first temperature of from 25 to 45° C., and the second reaction zone optionally is heated to a second temperature of from 30 to 55° C. The residence time in the first reaction zone preferably is from 1 to 15 hrs, while the residence time in the second reaction zone preferably is lower, e.g., from 0.25 to 7 hrs. The ratio of the residence time in the first reaction zone to the residence time in the second reaction zone preferably is from 1:4 to 4:1.

In a preferred embodiment, the second olefin monomer is only polymerized in the presence of the catalyst system in the effluent without the addition of a separate catalyst system. The catalyst system employed in the reaction process or system preferably comprises an alkyl-halide and an alkyl-aluminum, more preferably isobutyl bromide and triethylaluminum.

BRIEF DESCRIPTION OF THE DRAWINGS

The foregoing and other objects and advantages of our invention will appear more fully from the following description, made in connection with the accompanying drawings of non-limiting preferred embodiments of the inventions, wherein like characters refer to the same or similar parts throughout the views, and in which:

FIG. 1A is a flowchart of a general process in accordance with an embodiment of the present invention;

FIG. 1B is a flowchart of the general process of FIG. 1A with additional steps;

DETAILED DESCRIPTION OF THE INVENTION

Figure 2:
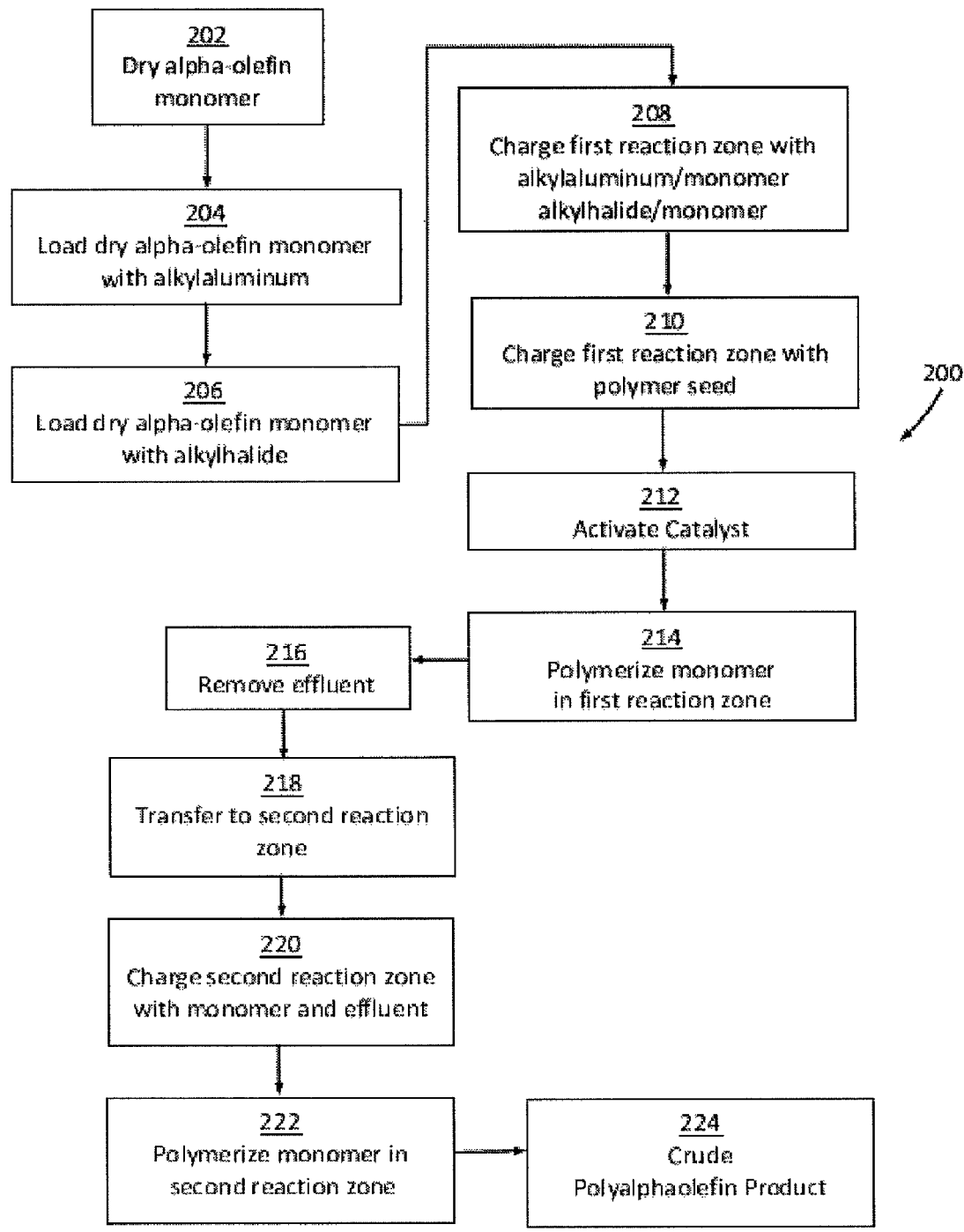
FIG. 2 is a flowchart of an exemplary continuous process in accordance with an embodiment of the present invention.

The invention is directed to systems and methods for producing polyalphaolefins (PAOs), and in particular, to systems and methods that provide the ability to control the viscosity of the PAO foamed. The process involves polymerizing an alpha-olefin monomer in the presence of a catalyst system in at least two reaction zones. In a first reaction zone, a first olefin monomer is polymerized in the presence of a catalyst system to form an effluent that comprises a first polymer and an activated catalyst. The effluent or a portion thereof is then directed to a second reaction zone. A second olefin monomer (which may be compositionally the same as the first monomer) also is directed to the second reaction zone, and polymerization continues in the second reaction zone to form a final polymer product of desired viscosity.

In the systems and processes of the invention, the catalyst system preferably is activated in the first reaction zone by a seed polymer, such as a seed PAO. The resulting activated catalyst system is then transferred to the second reaction zone with the first polymer that is formed in the first reaction zone. Unlike the first reaction zone, fresh catalyst preferably is not added to the second reaction zone, although it is contemplated that in some embodiments additional catalyst may be added to the second reaction zone. Instead, the catalyst in the second reaction zone is derived primarily if not exclusively from the activated catalyst system formed in the first reaction zone and which is transferred to the second reaction zone in the effluent from the first reaction zone. With the addition of the second olefin monomer to the second reaction zone, however, the effective catalyst concentration in the second reaction zone is less than the effective catalyst concentration in the first reaction zone. This ideally results in the formation of a final polymer product having an overall molecular weight that is less than the molecular weight of the first polymer. As a result, the final polymer product typically has a viscosity that is lower than the viscosity of the first polymer. By controlling the feed rates of the first and second monomers and the respective residence times in the first and second reaction zones, among other process parameters, the systems and processes of the present invention provide the ability to form a final polymer product having carefully controlled properties, such as, for example, viscosity and molecular weight.

The systems and processes of the invention are particularly well suited for forming high viscosity PAO's. As used herein, the term "high viscosity" refers to base stocks having a kinematic viscosity at 100° C. ($Kv_{100}$) of greater than about 30 cSt ($mm^2/s$), or in terms of ranges, from 20-1000 cSt, e.g., 30-800 cSt or 35-500 cSt. Commercially high viscosity base stocks are available as $Kv_{100}$ 32 cSt, 40 cSt, 50 cSt, 68 cSt, 100 cSt, 150 cSt, 200 cSt and 212 cSt grades, and the systems and processes of the invention may be used to form a final polymer product of any of these various grades. In one embodiment, for example, the final polymer product has a $Kv_{100}$ of about 100 cSt, e.g., from 70-140 cSt, from 80-120 cSt, or from 90-110 cSt. In another embodiment, the final polymer product has a $Kv_{100}$ of about 40 cSt, e.g., from 20 to 60 cSt, from 30 to 50 cSt, or from 35 to 45 cSt. As used herein, "controllable" viscosity refers to a kinematic viscosity of a base stock that is determined by the processing factors used to produce the base stock. Embodiments of the present invention may form PAO base stocks having either a $Kv_{100}$ of about 40 cSt or about 100 cSt, or any other commercial grade of PAO base stock. It should be understood to those skilled in the art that the invention also may be used to control the viscosity of other high viscosity base stocks.

In a first aspect of the present invention, the final polymer product has a $Kv_{100}$ of about 70 to 140 cSt, from 80 to 120 cSt, or from 90 to 110 cSt. Final polymer product having a $Kv_{100}$ of about 100 cSt may be referred to as PAO-100 base stock.

In this aspect, the first polymer formed in the first reaction zone has a weight average molecular weight of from 4,000 to 10,000, e.g., 5,000 to 9,000, or from 5,500 to 8,000. For purposes of the present specification, weight average molecular weight is determined by Waters HPLC model 2695 at 35° C. using THF solvent, Waters Styrogel Columns (7.8×300 mm) and a Polystyrene Mol. Wt. Standard. The first polymer preferably has a $M_w/M_n$, polydispersity index (PDI), of from 1.0 to 4, e.g., from 1.2 to 2.5, or from 1.4 to 2. The first polymer also preferably has a $Kv_{100}$ of from 105 to 500 cSt, e.g., from 110 to 250 cSt, or from 120 to 200 cSt. The first polymer from the first reaction zone preferably has a viscosity higher than the desired viscosity of the final polymer product to be formed, e.g., by at least 5%, at least 10% or at least 20% and at most 500%, at most 250% or at most 100%.

The final polymer product formed in the second reaction zone preferably has a weight average molecular weight of from to 2,500 to 9,000, e.g., from 3,000 to 8,000, or from 4,000 to 7,000. The final polymer product preferably has a PDI of from 1 to 4, e.g., from 1.2-2.5, or from 1.4-2. The final polymer product also preferably has a $Kv_{100}$ of from 70-140 cSt, e.g., from 80-120, or from 90-110. As indicated above, the molecular weight and viscosity of the final polymer product preferably is less than the first polymer. In one embodiment, the molecular weight difference of the final polymer product compared to the first polymer is from 500 to 8000, e.g., from 1000 to 6000, e.g., 1500 to 4000 amu. Most preferably the difference in molecular weight is at least 2000 amu. It is believed, however, that a molecular weight difference of greater than 8000 amu adversely affects the controllable high viscosity for a final polymer product having a $Kv_{100}$ of about 100 cSt.

The final polymer product may comprise a substantially saturated polyolefin having an iodine number, for example, of from about 0.1 to about 10, preferably from about 0.5 to about 6, more preferably from about 1 to about 4. Further, the PAO-100 base stocks preferably have a low glass transition temperature ($T_g$) of below about −50° C., preferably below about −65° C., more preferably below about −70° C.

In a second aspect of the present invention, the final polymer product has a $Kv_{100}$ of about 40 cSt, e.g., from 20-60 cSt, from 30-50 cSt, or from 35-45 cSt. PAO having a $Kv_{100}$ of about 40 cSt is referred to as PAO-40 base stock. In this aspect, the first polymer formed in the first reaction zone preferably has a weight average molecular weight of from 500 to 8,000, e.g., from 2,000 to 6,000, or from 3000 to 5,000 amu, and preferably has a first polymer has a PDI of from 1.0 to 10, e.g., from 1.2 to 6, or from 1.3 to 4.0. This first polymer has a $Kv_{100}$ of from 20 to 200, e.g., from 30 to 150 cSt, or from 40 to 100 cSt, which preferably is greater than the desired viscosity of the PAO-40 final polymer product.

The final polymer product in this aspect of the invention, i.e., the PAO-40 base stock, formed in the second reaction zone preferably has a weight average molecular weight of from 500 to 6,000 amu, e.g., from 1,000 to 5000, or from 2,000 to 4,000 amu. The final polymer product preferably has a PDI of from 1 to 10, e.g., from 1.2 to 6, or from 1.4 to 4 and has a $Kv_{100}$ of from 20 to 60 cSt, e.g., from 30 to 50 cSt, or from 35 to 45 cSt. As indicated above, the molecular weight and viscosity of the final polymer product preferably is less than the molecular weight and viscosity of the first polymer. In this aspect, the molecular weight difference between the first polymer and the final polymer product preferably is from 50 to 3000, e.g., from 100 to 2000 or from 150 to 1500. Most preferably the molecular weight difference is at least 150. As with the PAO-100 base stock, a molecular weight different of greater than 3000 is generally undesirable.

The PAO-40 final polymer product may comprise a substantially saturated polyolefin having an iodine number of from about 0.1 to about 10, preferably from about 0.5 to about 6, more preferably from about 1 to about 4. Further, these final polymer products ideally have a low glass transition temperature ($T_g$) of below about −50° C., preferably below about −65° C., more preferably below about −70° C.

In one embodiment of the present invention, the final polymer product formed, e.g., PAO-100 or PAO-40 base stock, is substantially free of lower oligomers. In other words, the final polymer product may comprise dimers, trimers and tetramers, if at all, in an amount less than 1 wt %, e.g., less than 0.5 wt %, or less than 0.2 wt %, based on the total weight of the final polymer product.

One advantage of the first and second aspects of the invention is that polymerization in the first and second reaction zones shifts the PDI toward the formation of polymers having favorable performance characteristics. PAO base stocks having high PDIs, for example greater than 5, generally do not exhibit favorable performance due to shear thinning over time. Conversely, highly monodisperse PAO base stocks having narrow PDIs, e.g., less than 1.1, also generally do not exhibit favorable performance due to poor low temperature properties. Conventionally, controlling PAO viscosity has involved blending monodisperse PAOs until a final PAO composition is formed having the desired viscosity characteristics. This process typically results in the formation of PAOs having undesirably high PDIs. The PAO base stocks formed according to the systems and processes of the invention, on the other hand, have desirable viscosities and desirable PDIs as indicated above. As a result, PAOs having the desirable viscosity and PDI characteristics may be formed according to the invention without sacrificing stability or low temperature properties.

Another advantage of the invention is that it results in improved PAO productivity relative to conventional PAO synthesis processes. As used herein, productivity refers to the mass of PAO formed per unit reaction mass per hour. Conventional PAO reaction systems that have a single reaction zone typically form less than 0.15 grams of PAO for every gram of reaction mass per hour. In the systems and processes of the present invention, however, productivity may be increased by 10% to 300%, e.g., from 30% to 200% or from 50% to 100% while also reducing the amount of catalyst from 0 wt % to 40 wt %, e.g., from 10 wt % to 25 wt %, or from 10 wt % to 30 wt % vs. conventional reaction systems. In other words, the processes of the invention may form at least 0.15 grams of PAO, e.g., at least 0.25 grams of PAO or at least 0.30 grams PAO for every gram of reaction mass per hour. The relative amount of catalyst used is reduced because catalyst is added to the first reaction zone and then transferred to the second reaction zone in the effluent. Preferably, no additional catalyst is added to the second reaction zone. The reduction in catalyst realized with the present invention also improves overall cost efficiencies due to the relative high cost of catalyst.

Starting Materials—Monomer and Catalyst

As indicated above, a first olefin monomer is directed to the first reaction zone and a second olefin monomer is directed to the second reaction zone. Preferably, the first and second olefin monomers are alpha-olefin monomers. Suitable alpha-olefin monomers or α-monomers include linear or branched monoolefins in which the double bond thereof is at the alpha position of the carbon chain of the monoolefin. Such α-monomers include those containing from 2 to 20 carbon atoms, e.g., from 6 to 14 carbon atoms, or from 8 to 12 carbon atoms. The carbon chain may be linear, cyclic, or aromatic. Examples of such α-monomers include, but are not limited to, ethylene, propylene, 2-methylpropene, 1-butene, 3-methyl-1-butene, 1-pentene, 4-methyl-1-pentene, 1-hexene, 4-methyl-1-hexene, 1-heptene, 3-methyl-1-heptene, 1-octene, 3-methyl-1-octene, 1-nonene, 3-methyl-1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and vinyl aromatic monomers such as styrene and α-methyl styrene. In one embodiment, the preferred α-monomers are a single monomer, i.e. not a mixture, and are selected from 1-hexene, 1-octene, 1-decene, and 1-dodecene, and most preferably 1-decene. Alpha-olefin monomers used in both stages of the manufacture of the PAO of the inventive process can contain substantially one type, i.e., the same number of carbon atoms per molecule. Ideally, the first and second olefin monomers are compositionally the same material, but are directed separately to the first and second reaction zones, respectively.

The purity level of the α-monomer employed, preferably 1-decene, ideally, but not necessarily, is greater than 90 wt %, e.g., greater than 97 wt % or greater than 99 wt %. The purity level of the α-monomer may vary depending on the catalyst system employed.

The catalyst system may comprise any catalyst system used for polymerizing alpha-olefin monomers. In one embodiment, a suitable olefin polymerization catalyst system includes an alkyl-halide/alkyl-aluminum catalyst system. An exemplary alkyl-halide/alkyl-aluminum catalyst system is described in U.S. Pat. No. 4,469,910, the contents of which are incorporated by reference herein. Suitable catalyst systems include those that form PAO through cationic polymerization or anionic polymerization or by using coordination catalysts. These catalyst systems include Friedel-Crafts catalysts, Ziegler-Natta catalysts, metallocene procatalyst with a suitable co-catalyst, and those described in U.S. Publication No. 2008/0053873 and U.S. Pat. Nos. 7,129,306, 6,858,767, 6,713,582, 6,225,427, 6,060,572, 5,229,478, 4,748,221, 4,294,721, 4,107,413, 3,862,257, and 3,732,198, the contents of which are incorporated by reference herein.

An alkyl-halide/alkyl-aluminum catalyst system is preferred by the embodied processes and systems of the invention. Suitable alkyl-halides include those having the formula:

wherein $R_1$ is selected from the group consisting of linear and branched $C_1$-$C_{100}$ alkyl groups, linear or branched $C_2$-$C_{100}$ alkenyl, and substituted or unsubstituted $C_5$-$C_{100}$ cycloalkyl groups. In one embodiment, $R_1$ is selected from the group consisting of linear and branched $C_4$-$C_{10}$ alkyl groups, linear or branched $C_2$-$C_{10}$ alkenyl, and substituted or unsubstituted $C_5$-$C_{10}$ cycloalkyl groups. X is selected from halogens and includes F, Cl, Br, and I. Preferred alkyl-halides compounds include ethyl bromide, n-butyl bromide, tert-butyl bromide, isobutyl bromide, isobutyl chloride, isobutyl iodide, vinyl fluoride, vinyl chloride, vinyl bromide, or include dihaloalkanes such as 1,2 dibromobutane.

Suitable alkyl-aluminum compounds include those having the formula:

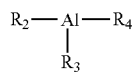

wherein $R_2$, $R_3$ and $R_4$ are independently selected from the group consisting of hydrogen, linear and branched $C_1$-$C_{40}$ alkyl groups, linear or branched $C_2$-$C_{40}$ alkenyl, and substituted or unsubstituted $C_5$-$C_{40}$ cycloalkyl groups. In one embodiment, at least one of $R_2$, $R_3$ or $R_4$ is not hydrogen and more preferably none of $R_2$, $R_3$ or $R_4$ is hydrogen. In one embodiment, $R_2$, $R_3$ and $R_4$ are independently selected from the group consisting of linear and branched $C_4$-$C_{10}$ alkyl groups, linear or branched $C_2$-$C_{10}$ alkenyl, and substituted or unsubstituted $C_5$-$C_{10}$ cycloalkyl groups. Preferred alkyl-aluminum compounds include trimethylaluminum, triethylaluminum, tripropylaluminum, triisopropylaluminum, and tributylaluminum. Most preferably triethylaluminum (TEA) is used in a catalyst system of the present invention. The mole ratio of alkyl halide, e.g., isobutyl bromide (IBB), to alkyl alkyl-aluminum compound, e.g., TEA, optionally is from 4:1 to 8:1, e.g., from 4:1 to 5:1 or about 4.5:1.

Although the present invention will mainly be described in terms of using the alkyl-halide/alkyl-aluminum catalyst system, and more preferably the IBB/TEA catalyst system, the present invention is not limited to this catalyst system and includes other catalyst systems suitable for polymerizing alpha-olefin monomers.

Exemplary PAO products formed by the systems and processes of the invention are homopolymers and include, but are not limited to, polyethylene, polypropylene, poly(2-methylpropene), polybutene, poly(3-methyl-1-butene), polypentene, poly(4-methyl-1-pentene), polyhexene, polyheptene, polyoctene, polynonene, poly(3-methyl-1-nonene), polydecene, polyundecene, polydodecene, polytridecene, polytetradecene, polypentadecene, polyhexadecene, polyheptadecene, polyoctadecene, polynonadecene, and polyeicosene. Co-polymers may also be formed by the inventive processes where co-monomer, for example, is fed together to either or both stages or are introduced sequentially, i.e., one to the first stage reactor and the other to the second stage reactor.

Processes

Returning to the processes of the present invention for forming final polymer products having desired viscosity characteristics, e.g., having a $Kv_{100}$ of about 40 cSt or about 100 cSt, the process 100, as shown in FIG. 1A, involves charging a first olefin monomer, preferably a first alpha-olefin monomer, and a catalyst system to a first reaction zone. The first olefin monomer is polymerized in a first polymerization step 102 in the presence of the catalyst system under polymerization conditions to form a first polymer, which is yielded from the first reaction zone in an effluent that comprises the first polymer. An activated catalyst also is foamed and used in the polymerization process and also preferably is yielded from the first reaction zone in the effluent. Typically, the effluent is formed once a steady state has been obtained in a continuous process.

The amount of catalyst present in the first reaction zone will vary depending primarily on the target viscosity of the PAO to be formed. Generally, the catalyst system optionally is present in the first reaction zone in an amount of from 1.0% to 15 wt %, e.g., from 1.5% to 8 wt % or from 2% to 6 wt %, based on the total weight of the contents in the first reaction zone. For formation of PAO-100, the catalyst system optionally is present in the first reaction zone in an amount of from 2.5 to 15 wt %, e.g., from 3 to 5 wt % or about 3.75 wt %, based on the total weight of the contents in the first reaction zone. For formation of PAO-40, less catalyst may be used. For example, for the formation of PAO-40, the catalyst system optionally is present in the first reaction zone in an amount of from 1 to 6 wt. %.

The temperature in the first reaction zone preferably is from 5° C. to 85° C., e.g., from 10° C. to 60° C., or from 20° C. to 50° C. The residence time in the first reaction zone preferably is from 0.25 to 15 hours, e.g., 2 to 10 hours, or from 3 to 8.5 hours. For purposes of this invention, residence time refers to the reaction mass in the reaction zone divided by the mass-based flow rate of the contents added to the reaction zone (including catalyst). This time represents the average time the α-monomer and polymer resides in each reaction zone. Thus, reaction zones with different volumes may be used and the residence time controlled by the flow rate. Preferably, when the volume of the reaction zone is about 100 L the flow rate is from 1.67 L/min to 0.11 L/min, e.g., from 0.83 L/min to 0.17 L/min or from 0.56 L/min to 0.20 L/min. To achieve the same residence time for a reaction zone twice the size requires doubling the flow rate.

Next, a second olefin monomer, preferably α-monomer, is charged to a second reaction zone along with the effluent from the first reaction zone under polymerization conditions. A second polymerization step 104 occurs in the second reaction zone to form the final polymer product. Preferably, the α-monomer charged to the second reaction zone as the second olefin monomer is substantially similar to or the same as the type of α-monomer that was charged to the first reaction zone as the first olefin monomer. Thus, for example when the first olefin monomer comprises decene, either nonene, decene, undecene, or dodecene (or a mixture of one or more of these monomers) may be added to the second reaction zone. Preferably, both the first and second olefin monomers comprise or consist essentially of decene. The molar ratio of α-monomer added to the first reaction zone as the first olefin monomer compared to the α-monomer added to the second reaction zone as the second olefin monomer preferably is from 4:1 to 1:4, e.g., from 3:1 to 1:3 or from 2:1 to 1:2. As more α-monomer is added to the second stage the productivity increases. However, adding monomer at less than a 1:4 molar ratio generally dilutes the catalyst so much that the polymerization is incomplete. In one preferred embodiment, the molar ratio of first olefin monomer added to the first reaction zone to second olefin monomer added to the second reaction zone is about 4:1.5.

The second polymerizing step 104 preferably is performed in series with the first polymerizing step 102, i.e., the first and second reaction zones are not operated in parallel. Additional alpha-olefin monomer is added and polymerized in the second polymerization step 104. In addition, the first polymer formed in the first polymerization 102 may be further polymerized in the second polymerization 104. As a result, the final polymer product ultimately formed in the second polymerizing step 104 may comprise a complex mixture of polymers some of which were formed in the first reaction zone from the first olefin monomer, i.e., the first polymer, some of which were formed in the second reaction zone from the second olefin monomer, and some of which were formed through reactions between the first polymer and the second olefin monomer.

As indicated above, with the addition of fresh second olefin monomer to the second reaction zone, the catalyst concentration in the second reaction zone preferably is less than the catalyst concentration in the first reaction zone. In one embodiment, catalyst is present in the second reaction zone in an amount 0.5 to 12 wt %, e.g., from 1 to 8 wt % or from 1.5 to 6 wt %, based on the total weight of contents in the second reaction zone. In this context, if an alkyl halide/alkyl aluminum compound catalyst system is used, the term "catalyst" refers to total amount of alkyl halide, e.g., IBB, and alkyl aluminum compound, e.g., TEA, collectively. Preferably, additional catalyst is not added to the second reaction zone, and any catalyst present in the second reaction zone is derived from the effluent of the first reaction zone. In another embodiment, substantially no additional catalyst is added to the second reaction zone, e.g., less than 3 wt %, less than 1.0 wt % or less than 0.1 wt %, based on the total weight of the contents in the second reaction zone. One advantage of the present invention is that by performing the polymerization steps 102 and 104 in series, no additional catalyst or substantially no additional catalyst needs to be added to the second reaction zone. This reduces catalyst usage in some embodiments of the present invention. Of course, in other embodiments, a minor amount of additional catalyst may be added to the second reaction zone. For example, from 1-3 wt. % of additional catalyst may be added to the second reaction zone.

The second reaction zone preferably has a temperature that is similar to the temperature of the first reaction zone (e.g., to within at least 30° C., at least 20° C. or at least 10° C.), and optionally the effluent may be heated 106, as shown in FIG. 1B, prior to introduction into the second reaction zone. The temperature in the second zone may be varied, for instance, to increase conversion in the second reaction zone and/or in order to modify the molecular weight in the second reaction zone. For example, the temperature in the second reaction zone may be from 0 to 100° C., e.g., from 10 to 80° C. or from 20 to 60° C. The residence time in the second reaction zone may vary widely but preferably is from 0.25 to 7 hrs, e.g., 0.5 to 5 hrs, or from 1 to 3.5 hrs. Preferably, residence time in the second reaction zone is less than the residence time in the first reaction zone, e.g., at least 0.25 hour less, at least 0.5 hours less or at least 1 hour less than the residence time in the first reaction zone. In terms of percentage difference, the residence time of the second reaction zone optionally is at least 10% less than the residence time of the first reaction zone, e.g., at least 35% less or at least 50% less. Generally, shorter residence times result in greater productivities and better catalyst efficiency. The ratio of the residence time in the first reaction zone to the residence time in the second reaction zone optionally is from 1:1 to 4:1, e.g., from 1.5:1 to 3:1 or from 1:1 to 2:1. Of course, in other embodiments, the second residence time may be greater than the first residence time, e.g., by at least 10%, at least 35% or at least 50%.

Optionally, a polymer seed may be added 108 to the first reaction zone, as shown in FIG. 1B, typically during system start up. A polymer seed may be necessary to activate certain catalyst systems used with some embodiments of the present invention. For example, a catalyst system comprising an alkyl-halide and an alkyl aluminum compound may require a polyalphaolefin seed to activate the catalyst. Once activated, the catalyst system remains activated in the effluent when transferred to the second reaction zone. Compositionally, the seed may be the same or similar to the final polymer product (PAO base stock) or the crude PAO produced by the second stage to be formed in the reaction system. The amount of seed may be added to the first reaction zone in an amount from 0.2 to 6 wt %, e.g., 0.5 to 3 wt % or 1 to 2 wt %, based on the total weight of the contents in the first reaction zone.

The overall conversion of the polymerization processes of the present invention may be greater than 85 percent, e.g., greater than 90 percent, greater than 95 percent or greater than 99 percent. Conversion refers to the amount of α-monomers (the first and second olefin monomers in combination) that are converted during the polymerization process to saturated monomers, PAO, or any other byproducts. Conversion percentage is calculated by dividing the weight of the α-monomers reacted by the weight of the α-monomers fed to the system. Selectivity, according to the processes of the invention, preferably also is maintained at a high level, e.g., at least 90 percent, at least 95 percent, at least 97 percent or at least 99 percent. As used herein, "selectivity" refers to the percent of converted α-monomers that are converted to the desired final polymer product, i.e., PAO (on a weight basis). A higher selectivity indicates a higher production of the desired PAO relative to non-PAO products. Similarly, the overall yield for the polymerization processes of the present invention may, for example, be greater than 75 percent, e.g., greater than 80 percent, greater than 85 percent, greater than 90 percent or greater than 95 percent. Yield is calculated by multiplying conversion by selectivity. In one embodiment, the selectivity is greater than 90 percent, the yield is greater that 75 percent and the conversion is greater than 85 percent. In still other embodiments, a PAO produced by the present invention may have the percentages defined by any combination of the above-identified ranges for selectivity, yield and conversion.

The process shown in FIGS. 1A and 1B may be performed using a continuous process or a batch process. Preferably, a continuous process is employed using a continuous system, such as two continuous stirred tank reactors (CSTR) connected in series or two plug flow reactors in series or one CSTR with one plug flow reactor.

It should be understood that in some embodiments, the process may employ one or more of the steps shown in FIG. 1B to form the desired final polymer product, i.e., polyalphaolefin product 110. In further embodiments, additional substeps may be used in combination with the steps shown in FIGS. 1A and 1B.

FIG. 2 illustrates an exemplary continuous process 200 using an alkyl-halide catalyst system according to one embodiment of the present invention. The continuous process 200 may be performed under an inert gas, such as nitrogen. Prior to polymerizing the alpha-olefin monomer, a drying column, preferably comprising a molecular sieve, dries the α-monomer in step 202. An additional recirculation loop may be used to further dry the α-monomer if necessary. Next, dry α-monomer is loaded to a feed cylinder in step 204 along with an alkyl-aluminum co-catalyst. The dry α-monomer is added until the concentration of the alkyl-aluminum co-catalyst preferably is from 1 to 10 wt %, e.g., 2 to 9 wt % or 3 to 8 wt %, based on the contents of the feed cylinder. Due to its pyrophoric properties, the alkyl-aluminum co-catalyst should be added without contacting the atmosphere or moisture. Optionally, half of the amount of the dry α-monomer may be preloaded into the feed cylinder prior to adding the alkyl-aluminum co-catalyst. The remaining amount of dry α-monomer may be added after the alkyl-aluminum co-catalyst.

The dry alpha-olefin monomer is also loaded in step 206 to a feed cylinder along with an alkyl-halide co-catalyst. The dry α-monomer is added until the concentration of the alkyl-halide co-catalyst preferably is from 1 to 15 wt %, e.g., from 2 to 10 wt % or from 3 to 8 wt %, based on the contents of the feed cylinder. Preferably, due to its pyrophoric properties, the alkyl-aluminum co-catalyst is added without contacting the atmosphere or moisture. Optionally, half of the amount of the dry α-monomer may be preloaded into the feed cylinder prior to adding the alkyl-halide co-catalyst. The remaining amount of dry α-monomer may be added after the alkyl-halide co-catalyst. The loading processes, steps 204 and 206, may be done simultaneously or in stages, in either order.

Once the feed cylinders are started, the process 200 charges the alkyl-aluminum co-catalyst/monomer and the alkyl-halide co-catalyst/monomer to a first reaction zone as shown in step 208. The feed rate of the alkyl-aluminum co-catalyst/monomer and alkyl-halide co-catalyst/monomer varies with the volume of the first reaction zone such that the residence time in the first reaction zone is ideally from 1 to 15 hrs, e.g., 2 to 10 hrs, or from 3 to 8.5. In one embodiment, the alkyl-aluminum co-catalyst/monomer and alkyl-halide co-catalyst/monomer feed are fed at a stream rate ratio of 4:1 to 1:4, e.g., 3:2 to 2:3, or most preferably 1:1.

In one embodiment, the alpha-olefin monomer does not initially polymerize after being charged to the first reaction zone in step 208 until a polymer seed is also charged to the first reaction zone (step 210) and steady state is achieved. Preferably, the polymer seed has the same molecular weight as the desired final polymer product, i.e., PAO, to be formed by process 200. Next, the catalyst system is activated in step 212 and the first olefin monomer begins polymerizing in step 214 in the first reaction zone under the desired temperature, pressure and residence times disclosed above. The resulting effluent is removed in step 216 from the first reaction zone and is transferred in step 218, at least in part, into a second reaction zone, which is in fluid communication with the first reaction zone. In one embodiment, the effluent may be flowable and have a viscosity of at least 50 cSt, e.g., at least 110 cSt or at least 150 cSt. Additional α-monomer, i.e., the second olefin monomer, preferably of substantially the same type, is charged to the second reaction zone in step 220 and the second olefin monomer is polymerized in step 222. Ideally, no additional catalyst is added to the second reaction zone prior to, during or after the polymerization step 222 other than catalyst obtained from the first reaction zone effluent. Typically, the first polymer formed in the first reaction zone also is further polymerized to some extent in the second reaction zone. The final polymer product, i.e., crude PAO product, is ultimately formed in step 224 in the second reaction zone. Desirably, various process parameters such as temperature, residence time, and flow rates in the first and second reaction zones may be manipulated in order to form a final polymer product having the desired viscosity, low temperature properties and stability characteristics. Further additional clean-up processing steps may be included.

System

Figure 3:
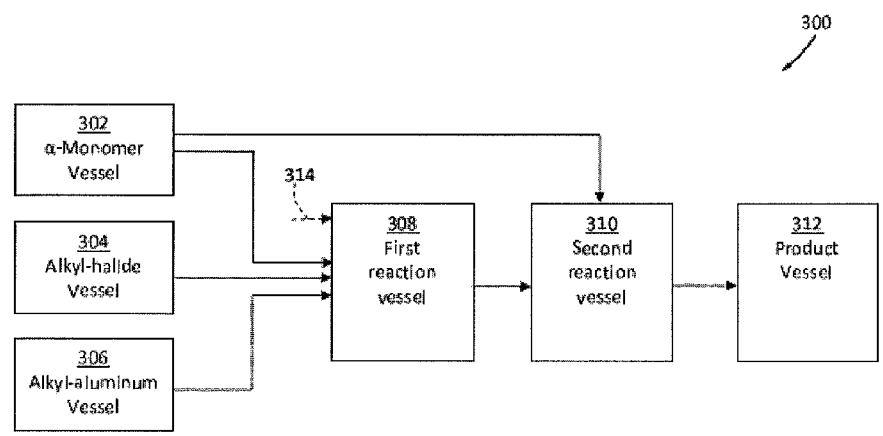
FIG. 3 is a schematic diagram of an exemplary system in accordance with an embodiment of the present invention.

An exemplary reaction system 300 for the present invention in shown in FIG. 3. As shown, system 300 includes two reaction vessels (reactors) 308, 310 connected in series. First reaction vessel 308 receives α-monomer from α-monomer vessel 302, alkyl-halide from alkyl-halide vessel 304 and alkyl-aluminum from alkyl-aluminum vessel 306. In one embodiment, α-monomer from α-monomer vessel 302 is combined with alkyl-halide from alkyl-halide vessel 304 and collectively fed into first reaction vessel 308. Additionally or alternatively, α-monomer from α-monomer vessel 302 may be combined with alkyl-aluminum from alkyl-aluminum vessel 306 and collectively fed into first reaction vessel 308. In one embodiment, α-monomer vessel 302 holds either wet α-monomer or dry α-monomer. Optionally, the reaction system comprises two α-monomer vessels 302, one for holding wet α-monomer and one for holding dry α-monomer. The system may also include a drying unit, e.g., mol sieve column, for drying wet α-monomer. Optionally, a polymer seed stream 314 is fed to first reaction vessel 308, particularly during start up of the reaction system, to facilitate polymerization.

After polymerization has been initiated in first reaction vessel 308, an effluent comprising a first polymer and activated catalyst is directed from first reaction vessel 308 to second reaction vessel 310. In addition to the effluent, the second reaction vessel 310 also receives additional α-monomer, for example, from α-monomer vessel 302. In another embodiment, not shown, a second α-monomer, different from the α-monomer that is directed to first reaction vessel 308, is directed to second reaction vessel 310. Product from the second reaction vessel 310 is directed to product vessel 312.

First reaction vessel 308 and second reaction vessel 310 optionally each have an agitator and a heating and/or cooling jacket. The agitator preferably operates at a rate of from 100 to 2000 rpm, e.g., from 200 to 1,000 rpm or from 300 to 800 rpm. In one embodiment, either or both reaction vessels are continuous stirred tank reactors (CSTRs).

Reaction system 300 may be operated under control of an automated system, such as a Camile™ automation system, made by Biotage AB Corporation or Honeywell, Mettler-Toledo, or Symyx systems.

selected from oil soluble salts, esters, amino-esters, amides, imides, and oxazolines of long chain hydrocarbon-substituted mono- and polycarboxylic acids or anhydrides thereof; thiocarboxylate derivatives of long chain hydrocarbons; long chain aliphatic hydrocarbons having polyamine moieties attached directly thereto; and Mannich condensation products formed by condensing a long chain substituted phenol with formaldehyde and polyalkylene polyamine. In one exemplary embodiment, the lubricant composition may comprise one or more of the additives shown in Table 1.

TABLE 1

| ADDITIVE | Wt % (Desirable) | Wt % (Preferred) |
|---|---|---|
| Overbased Detergents | 0.1-15 | 0.2-9 |
| Corrosion Inhibitor | 0.0-5 | 0.0-1.5 |
| Anti-wear agents | 0.1-6 | 0.1-4 |
| Dispersants | 0.1-10 | 0.1-5 |
| Antioxidant | 0.0-5 | 0.01-3 |
| Pour Point Depressant | 0.0-5 | 0.01-1.5 |
| Antifoaming Agent | 0.0-5 | 0.001-0.15 |
| Friction Modifier | 0.0-5 | 0.0-1.5 |
| Viscosity Index Improver | 0.01-10 | 0.25-3 |
| Base stock | Balance (i.e. ~60-99.99) | Balance (i.e. ~80 to 99.99) |

In one embodiment, the process performed in reaction system 300 is conducted under a nitrogen or inert gas blank.

As will be appreciated by those skilled in the art, reaction system 300 may include additional components, such as, for example, pipes, vents, pumps, flow meters, pressure gauges, valves and level gauges, not shown in FIG. 3, that may be used with various embodiments of the system.

Applications

The final polymer product formed by the embodied systems and processes of the invention may be used as a base stock for a lubricant composition. In particular, the base stocks are suitable as an API Group IV base stock. Suitable lubricant compositions are described in U.S. Pat. Nos. 7,390,928, 7,375,061, 7,329,772, 7,229,951, and 7,145,038, the entire contents of which are hereby incorporated by reference. The lubricant compositions may also contain one or more other materials, for example, detergents, corrosion inhibitors, oxidative inhibitors, dispersants, pour point dispersants, anti-foaming agents, anti-wear agents, other viscosity modifiers, friction modifiers, and the like at the usual levels in accordance with well known practice. Other materials, including extreme pressure agents, low temperature properties modifiers, and the like, can also be used, as exemplified, respectively, by metallic phenates or sulfonates, polymeric succinimides, non-metallic or metallic phosphorodithioates, and the like, at the usual levels in accordance with well known practice. These materials do not detract from the value of the compositions of this invention, but rather serve to impart their customary properties to the particular compositions in which they are incorporated.

Lubricating oil compositions of the present invention can further contain one or more ashless dispersants, which effectively reduce deposit formation upon use in gasoline and diesel engines. Ashless dispersants useful in the compositions of the present invention comprise an oil soluble polymeric long chain backbone having functional groups capable of associating with particles to be dispersed. Typically, such dispersants comprise amine, alcohol, amide or ester polar moieties attached to the polymer backbone, often via a bridging group. The ashless dispersant, for example, can be Preferred dispersants include polyamine-derivatized poly-alpha-olefin, dispersants, particularly ethylene/butene alpha-olefin and polyisobutylene-based dispersants. Particularly preferred are ashless dispersants derived from polyisobutylene substituted with succinic anhydride groups and reacted with polyethylene amines, e.g., polyisobutylene succinimide, polyethylene diamine, tetraethylene pentamine; or a polyoxyalkylene polyamine, e.g., polyoxypropylene diamine, trimethylolaminomethane; a hydroxy compound, e.g., pentaerythritol; and combinations thereof. One particularly preferred dispersant combination is a combination of (A) polyisobutylene substituted with succinic anhydride groups and reacted with (B) a hydroxy compound, e.g., pentaerythritol; (C) a polyoxyalkylene polyamine, e.g., polyoxypropylene diamine, or (D) a polyalkylene diamine, e.g., polyethylene diamine and tetraethylene pentamine using about 0.3 to about 2 moles of (B), (C) and/or (D) per mole of (A). Another preferred dispersant combination comprises a combination of (A) polyisobutenyl succinic anhydride with (B) a polyalkylene polyamine, e.g., tetraethylene pentamine, and (C) a polyhydric alcohol or polyhydroxy-substituted aliphatic primary amine, e.g., pentaerythritol or trismethylolaminomethane, as described in U.S. Pat. No. 3,632,511.

Another class of ashless dispersants comprises Mannich base condensation products. Generally, these products are prepared by condensing about one mole of an alkyl-substituted mono- or polyhydroxy benzene with about 1 to 2.5 moles of carbonyl compound(s) (e.g., formaldehyde and paraformaldehyde) and about 0.5 to 2 moles of polyalkylene polyamine, as disclosed, for example, in U.S. Pat. No. 3,442,808. Such Mannich base condensation products can include a polymer product of a metallocene catalyzed polymerization as a substituent on the benzene group, or can be reacted with a compound containing such a polymer substituted on a succinic anhydride in a manner similar to that described in U.S. Pat. No. 3,442,808. Examples of functionalized and/or derivatized olefin polymers synthesized using metallocene catalyst systems are described in the publications identified supra.

The dispersant can be further post treated by a variety of conventional post treatments such as boration, as generally taught in U.S. Pat. Nos. 3,087,936 and 3,254,025. Boration of the dispersant is readily accomplished by treating an acyl nitrogen-containing dispersant with a boron compound, such as boron oxide, boron halide boron acids, and esters of boron acids, in an amount sufficient to provide from about 0.1 to about 20 atomic proportions of boron for each mole of acylated nitrogen composition. Useful dispersants contain from about 0.05 to about 2.0 wt. %, e.g., from about 0.05 to about 0.7 wt. % boron. The boron, which appears in the product as dehydrated boric acid polymers (primarily $(HBO_2)_3$), is believed to attach to the dispersant imides and diimides as amine salts, e.g., the metaborate salt of the diimide. Boration can be performed by adding from about 0.5 to 4 wt. %, e.g., from about 1 to about 3 wt. % (based on the mass of acyl nitrogen compound) of a boron compound, preferably boric acid, usually as a slurry, to the acyl nitrogen compound and heating with stirring at from about 135° C. to about 190° C., e.g., 140° C. to 170° C., for from about one to about five hours, followed by nitrogen stripping. Alternatively, the boron treatment can be conducted by adding boric acid to a hot reaction mixture of the dicarboxylic acid material and amine, while removing water. Other post reaction processes commonly known in the art can also be applied.

The dispersant can also be further post treated by reaction with a so-called "capping agent." Conventionally, nitrogen-containing dispersants have been "capped" to reduce the adverse effect such dispersants have on the fluoroelastomer engine seals. Numerous capping agents and methods are known. Of the known "capping agents," those that convert basic dispersant amino groups to non-basic moieties (e.g., amido or imido groups) are most suitable. The reaction of a nitrogen-containing dispersant and alkyl acetoacetate (e.g., ethyl acetoacetate (EAA)) is described, for example, in U.S. Pat. Nos. 4,839,071, 4,839,072, and 4,579,675. The reaction of a nitrogen-containing dispersant and folinic acid is described, for example, in U.S. Pat. No. 3,185,704. The reaction product of a nitrogen-containing dispersant and other suitable capping agents are described in U.S. Pat. No. 4,663,064 (glycolic acid); U.S. Pat. Nos. 4,612,132, 5,334,321, 5,356,552, 5,716,912, 5,849,676, and 5,861,363 (alkyl and alkylene carbonates, e.g., ethylene carbonate); U.S. Pat. No. 5,328,622 (mono-epoxide); U.S. Pat. No. 5,026,495; U.S. Pat. Nos. 5,085,788, 5,259,906, 5,407,591 (poly (e.g., bis)-epoxides); and U.S. Pat. No. 4,686,054 (maleic anhydride or succinic anhydride). The foregoing list is not exhaustive, and other methods of capping nitrogen-containing dispersants are known to those skilled in the art.

For adequate piston deposit control, a nitrogen-containing dispersant can be added in an amount providing the lubricating oil composition with from about 0.03 wt. % to about 0.15 wt. %, preferably from about 0.07 to about 0.12 wt. %, of nitrogen.

Metal-containing or ash-forming detergents function both as detergents to reduce or remove deposits and as acid neutralizers or rust inhibitors, thereby reducing wear and corrosion and extending engine life. Detergents generally comprise a polar head with a long hydrophobic tail, with the polar head comprising a metal salt of an acidic organic compound. The salts can contain a substantially stoichiometric amount of the metal, in which case they are usually described as normal or neutral salts, and would typically have a total base number or TBN (as can be measured by ASTM D2896) of from 0 to 80. A large amount of a metal base can be incorporated by reacting excess metal compound (e.g., an oxide or hydroxide) with an acidic gas (e.g., carbon dioxide). The resulting overbased detergent comprises neutralized detergent as the outer layer of a metal base (e.g. carbonate) micelle. Such overbased detergents can have a TBN of 150 or greater and typically will have a TBN of from 250 to 450 or more.

Detergents that can be used include oil-soluble neutral and overbased sulfonates, phenates, sulfurized phenates, thiophosphonates, salicylates, naphthenates, and other oil-soluble carboxylates of a metal, particularly the alkali or alkaline earth metals, e.g., sodium, potassium, lithium, calcium, and magnesium. The most commonly used metals are calcium and magnesium, which can both be present in detergents used in a lubricant, and mixtures of calcium and/or magnesium with sodium. Particularly convenient metal detergents are neutral and overbased calcium sulfonates having TBN of from 20 to 450 TBN, and neutral and overbased calcium phenates and sulfurized phenates having TBN of from 50 to 450. Combinations of detergents, whether overbased or neutral or both, can be used.

Sulfonates can be prepared from sulfonic acids which are typically obtained by the sulfonation of alkyl substituted aromatic hydrocarbons such as those obtained from the fractionation of petroleum or by the alkylation of aromatic hydrocarbons. Examples included those obtained by alkylating benzene, toluene, xylene, naphthalene, diphenyl, or their halogen derivatives such as chlorobenzene, chlorotoluene and chloronaphthalene. The alkylation can be performed in the presence of a catalyst with alkylating agents having from about 3 to more than 70 carbon atoms. The alkaryl sulfonates usually contain from about 9 to about 80 or more carbon atoms, preferably from about 16 to about 60 carbon atoms, per alkyl substituted aromatic moiety.

The oil soluble sulfonates or alkaryl sulfonic acids can be neutralized with oxides, hydroxides, alkoxides, carbonates, carboxylate, sulfides, hydrosulfides, nitrates, borates, and ethers of the metal. The amount of metal compound is chosen having regard to the desired TBN of the final product but typically ranges from about 100 to 220 wt % (preferably at least 125 wt %) of that stoichiometrically required.

Metal salts of phenols and sulfurized phenols are prepared by reaction with an appropriate metal compound such as an oxide or hydroxide, and neutral or overbased products can be obtained by methods well known in the art. Sulfurized phenols can be prepared by reacting a phenol with sulfur or a sulfur containing compound such as hydrogen sulfide, sulfur monohalide, or sulfur dihalide, to form products which are generally mixtures of compounds in which two or more phenols are bridged by sulfur containing bridges.

Dihydrocarbyl dithiophosphate metal salts are frequently used as antiwear and antioxidant agents. The metal can be an alkali or alkaline earth metal, or aluminum, lead, tin, molybdenum, manganese, nickel or copper. The zinc salts are most commonly used in lubricating oil in amounts of 0.1 to 10 wt %, preferably 0.2 to 2 wt %, based upon the total weight of the lubricating oil composition. They can be prepared in accordance with known techniques by first forming a dihydrocarbyl dithiophosphoric acid (DDPA), usually by reaction of one or more alcohols or a phenol with $P_2S_5$ and then neutralizing the formed DDPA with a zinc compound. For example, a dithiophosphoric acid can be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used, but the oxides, hydroxides, and carbonates are most generally employed. Commercial additives frequently contain an excess of zinc due to the use of an excess of the basic zinc compound in the neutralization reaction.

The following are exemplary of such antiwear additives and are commercially available from The Lubrizol Corporation: Lubrizol 677A, Lubrizol 1095, Lubrizol 1097, Lubrizol 1360, Lubrizol 1395, Lubrizol 5139, and Lubrizol 5604, among others; and from Ciba-Geigy: Irgalube 353.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons, phosphorous esters, metal thiocarbamates, oil soluble copper compounds as described in U.S. Pat. No. 4,867,890, and molybdenum-containing compounds.

Typical oil soluble aromatic amines having at least two aromatic groups attached directly to one amine nitrogen contain from 6 to 16 carbon atoms. The amines can contain more than two aromatic groups. Compounds having a total of at least three aromatic groups, in which two aromatic groups are linked by a covalent bond or by an atom or group (e.g., an oxygen or sulfur atom, or a —CO—, —$SO_2$— or alkylene group) and two are directly attached to one amine nitrogen, are also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups.

Multiple antioxidants are commonly employed in combination. In one preferred embodiment, lubricating oil compositions of the present invention, contain from about 0.1 to about 1.2 wt. % of aminic antioxidant and from about 0.1 to about 3 wt. % of phenolic antioxidant. In another preferred embodiment, lubricating oil compositions of the present invention contain from about 0.1 to about 1.2 wt. % of aminic antioxidant, from about 0.1 to about 3 wt. % of phenolic antioxidant and a molybdenum compound in an amount providing the lubricating oil composition from about 10 to about 1000 ppm of molybdenum.

The following are exemplary of the secondary diarylamine antioxidants and are commercially available from Chemtura Corporation: Naugalube™ 438, Naugalube 438L, Naugalube 640, Naugalube 635, Naugalube 680, Naugalube AMS, Naugalube APAN, Naugard PANA, Naugalube 403, Naugalube 410, and Naugalube 420; and from Ciba-Geigy: Irganox™ L 06 and Irganox L 57. The following are exemplary of substituted phenol antioxidants that are commercially available from Chemtura Corporation: Naugard™ BHT, Antioxidant 431, and Naugalube 531; and from Ciba-Geigy: Irganox™ L 115, Irganox L 118, Irganox L 135, and Irgalube F 10A.

Representative examples of suitable viscosity modifiers are polyisobutylene, copolymers of ethylene and propylene, polymethacrylates, methacrylate copolymers, copolymers of an unsaturated dicarboxylic acid and a vinyl compound, interpolymers of styrene and acrylic esters, and partially hydrogenated copolymers of styrene/isoprene, styrenelbutadiene, and isoprene/butadiene, as well as the partially hydrogenated homopolymers of butadiene and isoprene.

A viscosity index improver dispersant functions both as a viscosity index improver and as a dispersant. Examples of viscosity index improver dispersants include reaction products of amines, for example, polyamines, with a hydrocarbyl-substituted mono- or dicarboxylic acid in which the hydrocarbyl substituent comprises a chain of sufficient length to impart viscosity index improving properties to the compounds. In general, the viscosity index improver dispersant can be, for example, a polymer of a $C_4$ to $C_{24}$ unsaturated ester of vinyl alcohol or a $C_3$ to $C_{10}$ unsaturated mono-carboxylic acid or a $C_4$ to $C_{10}$ dicarboxylic acid with an unsaturated nitrogen-containing monomer having 4 to 20 carbon atoms; a polymer of a $C_2$ to $C_{20}$ olefin with an unsaturated $C_3$ to $C_{10}$ mono- or dicarboxylic acid neutralized with an amine, hydroxyamine or an alcohol; or a polymer of ethylene with a $C_3$ to $C_{20}$ olefin further reacted either by grafting a $C_4$ to $C_{20}$ unsaturated nitrogen-containing monomer thereon or by grafting an unsaturated acid onto the polymer backbone and then reacting carboxylic acid groups of the grafted acid with an amine, hydroxy amine, or alcohol.

Friction modifiers and fuel economy agents that are compatible with the other ingredients of the final oil can also be included. Examples of such materials include glyceryl monoesters of higher fatty acids, for example, glyceryl monooleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine.

Other known friction modifiers comprise oil-soluble organo-molybdenum compounds. Such organo-molybdenum friction modifiers also provide antioxidant and antiwear credits to a lubricating oil composition. Examples of such oil soluble organo-molybdenum compounds include dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates, and alkylthioxanthates.

Additionally, the molybdenum compound can be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds.

Among the molybdenum compounds useful in lubricating compositions are organo-molybdenum compounds of the formula: $Mo(ROCS_2)_4$ and $Mo(RSCS_2)_4$, wherein R is an organo group selected from the group consisting of alkyl, aryl, aralkyl, and alkoxyalkyl, generally of from 1 to 30 carbon atoms, preferably 2 to 12 carbon atoms, and most preferably alkyl of 2 to 12 carbon atoms. Especially preferred are the dialkyldithiocarbamates of molybdenum.

Another group of organo-molybdenum compounds useful in the lubricating compositions are trinuclear molybdenum compounds, especially those of the formula $Mo_3S_kL_nQ_z$ and mixtures thereof wherein the L are independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms should be present among all the ligand organo groups, such as at least 25, at least 30, or at least 35 carbon atoms.

The following are exemplary of molybdenum friction modifier additives and are commercially available from R. T. Vanderbilt Company, Inc.: Molyvan™ A, Molyvan L, Molyvan 807, Molyvan 856B, Molyvan 822, Molyvan 855, among others. The following are also exemplary of such additives and are commercially available from Asahi Denka Kogyo K.K.: SAKURA-LUBE™ 100, SAKURA-LUBE 165, SAKURA-LUBE 300, SAKURA-LUBE 310G, SAKURA-LUBE 321, SAKURA-LUBE 474, SAKURA-LUBE 600, SAKURA-LUBE 700, among others. The following are also exemplary of such friction modifier additives and are commercially available from Akzo Nobel Chemicals GmbH: Ketjen-Ox™ 77M, Ketjen-Ox 77TS, among others. Naugalube MolyFM is also exemplary of such additives and is commercially available from Chemtura Corporation.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates. Foam control can be provided by an antifoamant of the polysiloxane type, for example, silicone oil or polydimethyl siloxane. An example of a pour point depressant is polymethacrylate, and the like.

Some of the above-mentioned additives can provide a multiplicity of effects; thus, for example, a single additive can act as a dispersant-oxidation inhibitor. This approach is well known and need not be further elaborated herein.

Examples of corrosion inhibitors include amine complexes, benzotriazole-, tolyltriazole-, thidiazole-, and imidazole-based compounds, and the like. The following is an exemplary corrosion inhibitors and is commercially available from King Industries, Inc.: K-Corr™ 100A2.

Examples of viscosity index (V.I.) improvers include olefin copolymers, dispersant olefin copolymers, ethylene-α-olefin copolymers wherein the α-olefin may be propylene, 1-butene, or 1-pentene, or the hydrides thereof, polyisobutylenes or the hydrides thereof, styrene-diene hydrogenated copolymers, styrene-maleate anhydride copolymers, and polyalkylstyrenes, and the like.

Example of anti-foamants include polysiloxane, silicones such as dimethylsilicone and fluorosilicone, and the like. The following is an exemplary anti-foamant and is commercially available from Munzing/Ultra Additives: Foam Ban™ MS-575.

The present invention will be better understood in view of the following non-limiting examples.

EXAMPLES

Comparative Example A

PAO-100 using Single Stage

A reaction system similar to FIG. 3 was used in all of the example runs. Reactors and all solutions were maintained under slightly positive pressure nitrogen blanket.

Figure 8:
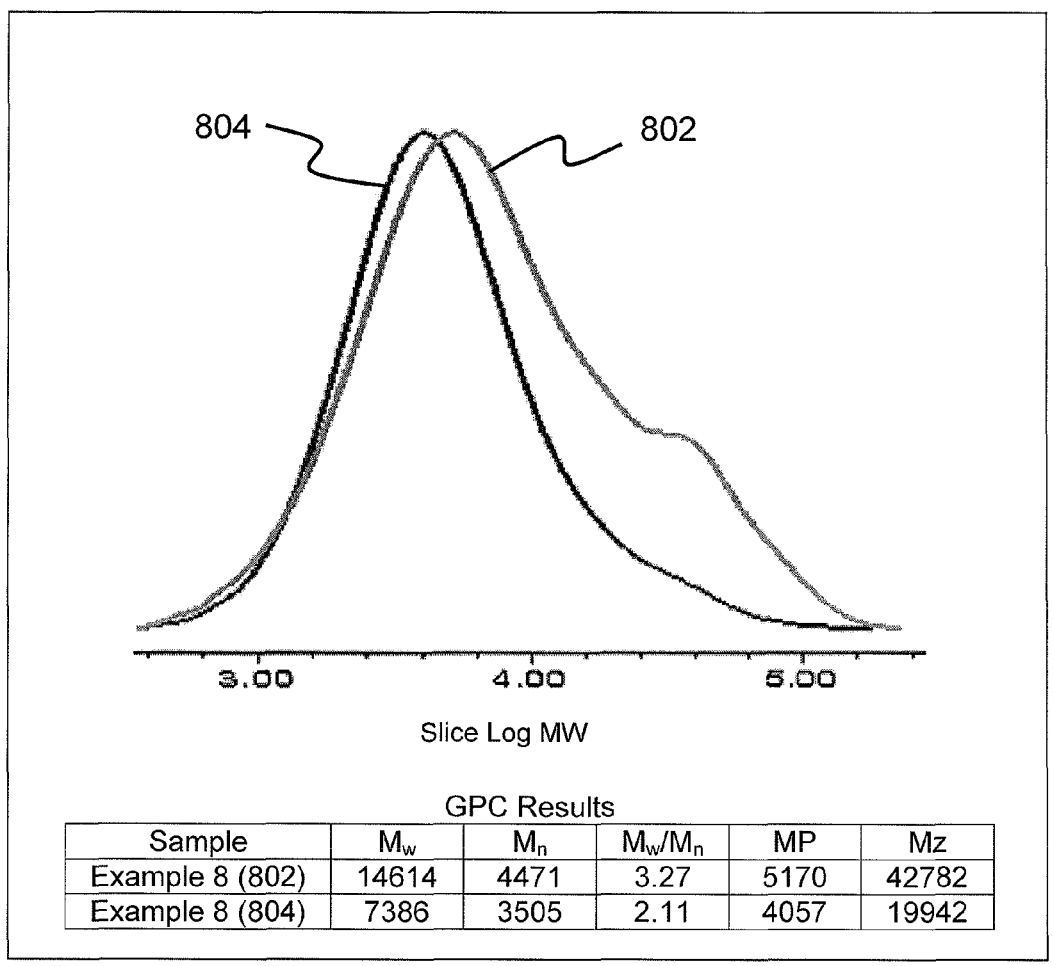
FIG. 8 is a molecular weight distribution diagram of a first polymer (802) and a final polymer product (804) formed in Example 8.
Figure 9:
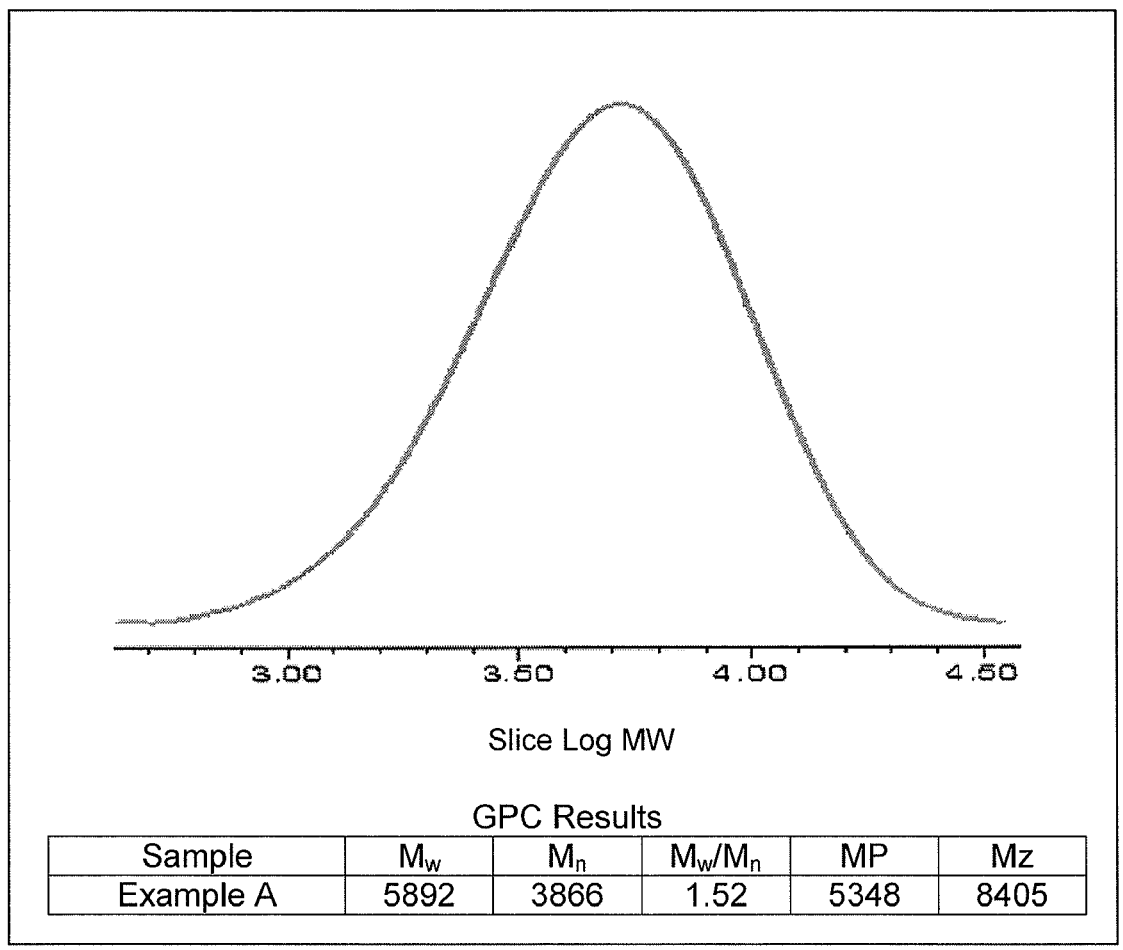
FIG. 9 is a molecular weight distribution diagram of a polymer formed in Comparative Example A.

A single stage process was used to polymerize 1-decene into a PAO-100 base stock. A second stage was added to the process, but no decene or catalyst was added in the second stage. Only the effluent from the first stage reaction was added to the second stage. The relative productivity for the initial reaction was defined as 1.0 and was equal to (0.59+0.59)/620/8.63=0.000221 grams polymer per gram reactor volume per hour. For the two reactor set up the relative productivity was 0.5 since the identical volume second reactor produced nothing. The relative catalyst usage was based on the catalyst used for this example, defined as (4.32)(0.59)/(0.59+0.59)+(3.16)(0.25)(0.59)/(0.59+0.59)=2.555 grams of catalyst used per 100 grams of polymer produced or 2.56%. FIG. 8 shows the molecular weight distribution of polymer formed in Example A as determined by gel permeation chromatography.

Comparative Example B

This was similar to Comparative Example A except that the flow rates were increased. Example B demonstrates that although merely increasing the flow rates increases productivity, the viscosity was reduced by the shorter residence times. The polymerization conditions and results are shown in Table 2 below.

Comparative Example C

This was similar to Comparative Examples A and B except that the flow rates were further increased. While relative productivity continued to increase, the viscosity was further reduced. The polymerization conditions and results are shown in Table 2 below. The relative catalyst usage for Comparative Examples A-C was 1.0.

Example 1

PAO-100 Using Series CSTR

A first olefin monomer, specifically dry 1-decene, was polymerized in two reactors in a CSTR system. In the first reactor a stream comprising a mixture of IBB/dry decene was charged at 0.53 g/min. The IBB concentration of this stream was 4.75 wt % of the total weight of the stream added to the first reactor. Also a stream of mixture of 25% TEA/dry decene was charged at 0.53 g/min and having a 25%-TEA concentration of 3.48 wt % of the total weight of the stream. The 25%-TEA was a dilute 25/75 mixture of pure TEA and decene. The reaction mass of the first reactor was 610 grams and thus the residence time of first reactor was 9.59 hours (610/(0.53+0.53)/60. The total catalyst concentration in the first reactor was (4.75)(0.53)/(0.53+0.53)+(0.25)(3.48)(0.53)/(0.53+0.53)=2.81 wt %.

610 g of a polydecene seed having a viscosity of 100 cSt was added to the first reaction zone to activate the catalyst. This seed was a taken from the second stage product of an earlier run. The temperature of the first reactor was set to 35° C. The agitation rate of the first reactor was 400 rpm. After operating for about 40 hours steady state conditions were achieved.

The effluent of the first reactor was transferred to the second reactor, which had a reaction mass of 620 grams of reaction mixture, here PAO-100, unreacted 1-decene, and catalyst. The temperature of the second reactor was set to 35° C. The agitation rate of the first reactor was 400 rpm. Decene was added to the second reactor at 0.53 g/min resulting in a residence time for the second reactor of 6.50 hours. Due to the addition of fresh second olefin monomer, the catalyst concentration was decreased from 2.81 wt % in the first reaction zone to (2.81)(0.53+0.53)/(0.53+0.53+0.53)=1.87 wt % in the second reaction zone. The relative catalyst concentration in Example 1 was reduced by 27% and the productivity was 67% vs. comparative Example A. Again, after operating for about 40 hours steady state conditions were achieved.

The viscosity of the first polymer formed in the first reactor was $Kv_{100}$ 147.6 cSt and the final polymer product had a viscosity $Kv_{100}$ of 101.4 cSt, as shown in Table 2 below.

Figure 4:
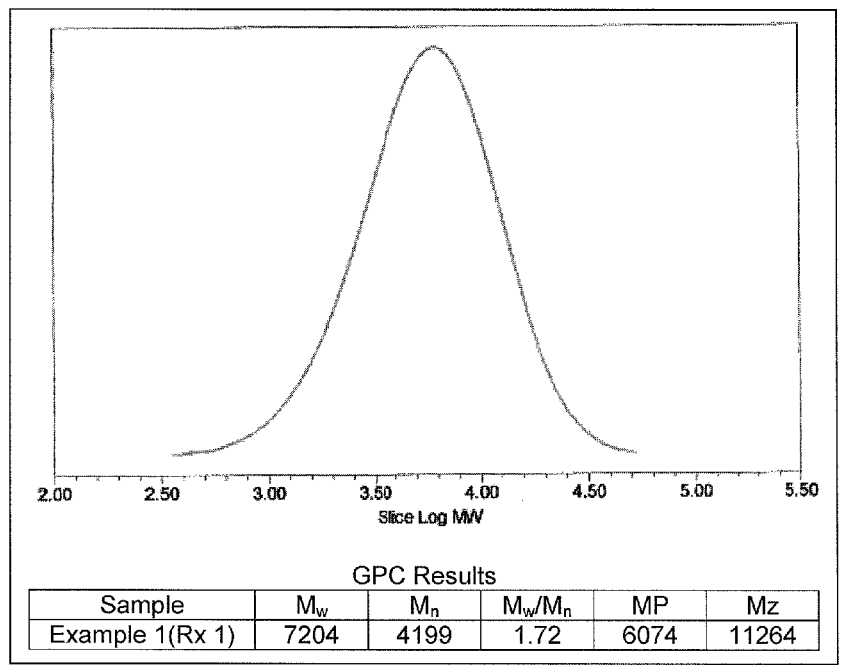
FIG. 4 is a molecular weight distribution diagram of a first polymer Banned in the first reaction zone of Example 1.
Figure 5:
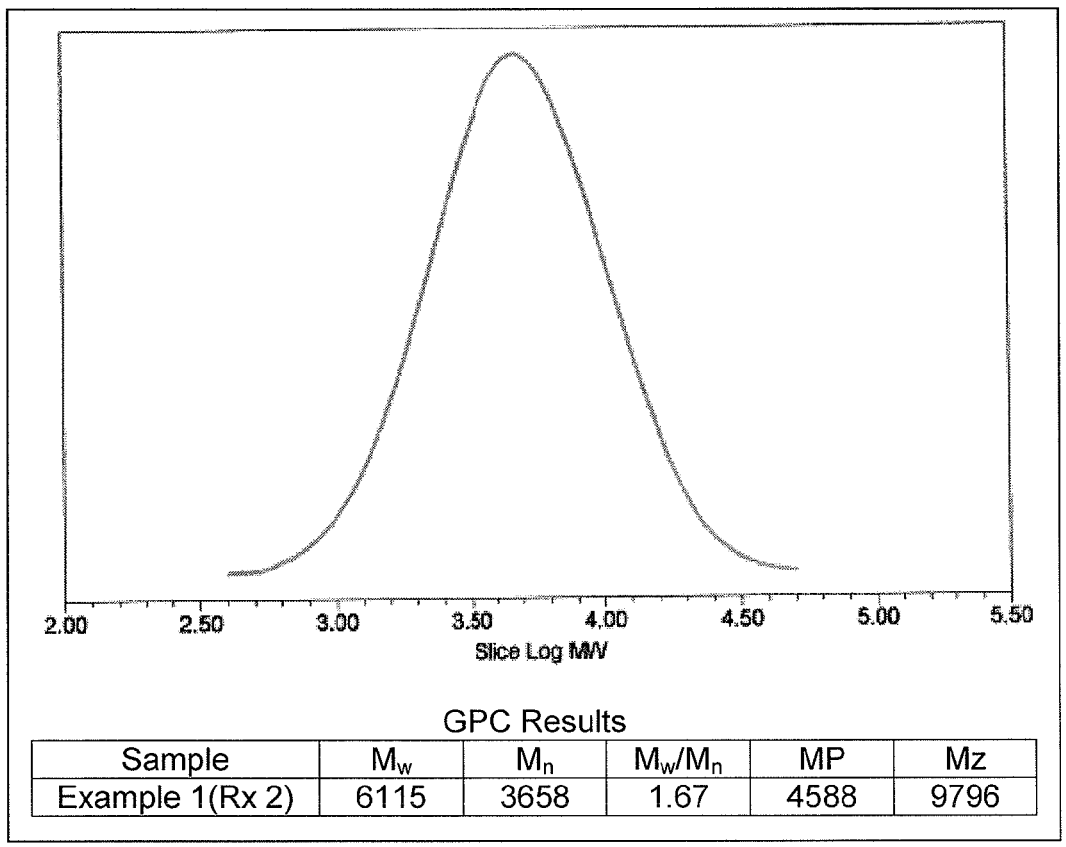
FIG. 5 is a molecular weight distribution diagram of a final polymer product formed in the second reaction zone of Example 1.

FIG. 4 is a graph showing the molecular weight distribution curve as determined by gel permeation chromatograph for the first polymer (polydecene) formed in the first reaction zone. Additional polymer product produced from the monomer in the second reaction zone combined with the first polymer to foam the final polymer product from the second reaction zone. FIG. 5 shows the molecular weight distribution curve for the final polymer product.

Example 2

PAO-100 using Series CSTR

Figure 6:
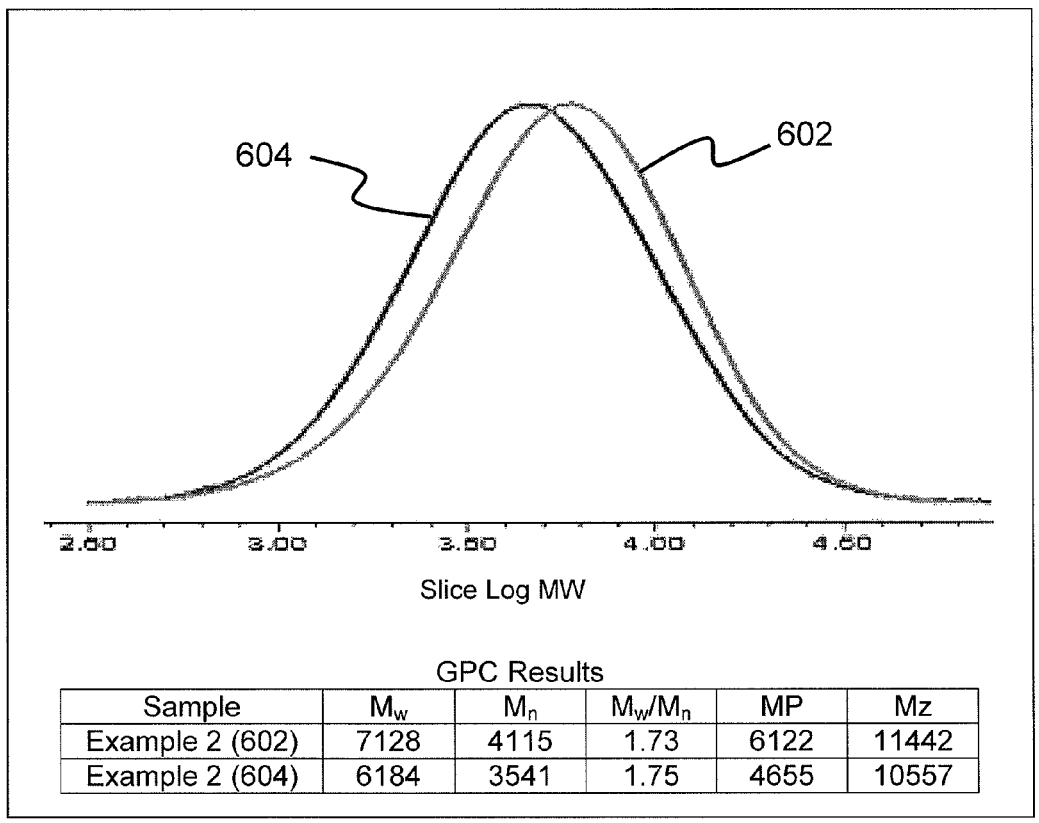
FIG. 6 is a molecular weight distribution diagram of a first polymer (602) and a final polymer product (604) formed in Example 2.

This process was similar to the series CSTR from Example 1, with the values shown in Table 2 below. The flow rate in the first reaction zone was increased and the residence time was reduced compared to Example 1. This resulted in a decrease in viscosity for the first reaction zone polymer as compared to the first polymer formed in Example 1. Also the volume of second reaction zone was decreased and the decene flow rated increased to the second reaction zone which reduced the residence time there resulting in the production of a PAO-100 product having a productivity of 1.02 and a relative catalyst reduction of 28%. FIG. 6 is a graph showing the molecular weight distribution curve 602 as determined by gel permeation chromatograph for the first polymer (polydecene) formed in the first reaction zone and the molecular weight distribution curve 604 for the final polymer product formed in the second reaction zone.

Example 3

This process was similar to the series CSTR from Example 1, with the values shown in Table 2 below. The flow rates were further increased, resulting in a decreased residence time, in the first reaction zone over Example 2, and the catalyst concentrations were increased to form higher viscosity polymer. The decene flow rate was increased to the second reaction zone and the second zone volume was increased so that the residence time was intermediate to Examples 1 and 2. Example 3 showed both an increased productivity and a reduced catalyst usage.

Example 4

This process was similar to the series CSTR from Example 1, with the values shown in Table 2 below. The flow rates were further increased, resulting in a decreased residence time, in the first reaction zone over Examples 1-3. The flow rate of 1-decene to the second reaction zone was again increased vs. Example 3 resulting in a lower residence time. Example 4 doubled the productivity while having reduced catalyst usage.

Example 5

This process was similar to the series CSTR from Example 1, with the values shown in Table 2 below. Very high flow rates to both reaction zones resulted in low residence times which normally would produce very low viscosity PAO. However, high catalyst concentrations in the first zone countered this effect on viscosity and the two stage system countered the high catalyst usage. A PAO-212 product was formed in Example 5. The relative catalyst usage for Example 5 was identical to the amount of catalyst normally needed for PAO-100. To produce PAO-212 base stock in a single stage would require 1.4 relative catalyst usage and 1.35 productivity. Thus, the values of 1.0 relative catalyst usage and 2.95 productivity represent a significant and unexpected improvement over a single stage process for producing PAO-212.

TABLE 2

| Example | 1 | 2 | 3 | 4 | 5 | A | B | C |
|---|---|---|---|---|---|---|---|---|
| First Stage | | | | | | | | |
| Residence Time (hrs) | 9.59 | 8.47 | 6.35 | 3.18 | 2.54 | 8.63 | 3.18 | 1.59 |
| IBB Conc. Wt % | 4.75 | 4.75 | 6.05 | 6.05 | 7.56 | 4.32 | 4.32 | 4.32 |
| IBB + Decene Flow Rate (g/min) | 0.53 | 0.60 | 0.80 | 1.60 | 2.00 | 0.59 | 1.60 | 3.20 |
| 25%-TEA Conc. Wt % | 3.48 | 3.48 | 4.42 | 4.42 | 5.53 | 3.16 | 3.16 | 3.16 |
| TEA + Decene Flow Rate (g/min) | 0.53 | 0.60 | 0.80 | 1.60 | 2.00 | 0.59 | 1.60 | 3.20 |
| Volume (g/min) | 610 | 610 | 610 | 610 | 610 | 610 | 610 | 610 |
| Kv100 (cSt) | 147.6 | 135.1 | 204.0 | 135.5 | 436.6 | 107.7 | 64.0 | 52.8 |
| Second Stage | | | | | | | | |
| Residence Time (hrs) | 6.5 | 2.9 | 3.69 | 2.15 | 1.48 | 8.77 | 3.23 | 1.61 |
| Volume (g) | 620 | 320 | 620 | 620 | 620 | 620 | 620 | 620 |
| Decene Flow Rate (g/min) | 0.53 | 0.64 | 1.2 | 1.6 | 3.0 | 0 | 0 | 0 |
| Final Product | | | | | | | | |
| Relative Productivity | 0.67 | 1.02 | 1.18 | 2.02 | 2.95 | 0.5 | 1.35 | 2.69 |
| $Kv_{100}$ (cSt) | 101.4 | 101.2 | 100.0 | 100.8 | 212.0 | 106.1 | 60.0 | 54.3 |
| Relative Cat. Used | 0.73 | 0.72 | 0.80 | 0.93 | 1.0 | 1.0 | 1.0 | 1.0 |

Example 6

PAO-40 using Series CSTR & Comparative Example D

This process was similar to the series CSTR from Example 1, under the polymerization conditions shown in Table 3 below. This process produced a PAO-40 product. When compared to the single stage reaction of Comparative Example D, the relative productivity was greatly increased and catalyst usage modestly increased. Generally less catalyst was required to make PAO-40 than PAO-100.

TABLE 3

| | Ex. 6 | Comp. Ex. D | Ex. 7 | Ex. 8 |
|---|---|---|---|---|
| | First Stage | | | |
| Residence Time (hrs) | 2.89 | 8.02 | 1.98 | 1.80 |
| IBB Conc. Wt % | 3.46 | 1.89 | 7.56 | 7.56 |

TABLE 3-continued

|  | Ex. 6 | Comp. Ex. D | Ex. 7 | Ex. 8 |
|---|---|---|---|---|
| IBB + Decene Flow Rate (g/min) | 1.76 | 0.54 | 0.63 | 1.25 |
| 25%-TEA Conc. Wt % | 2.53 | 1.39 | 5.53 | 5.53 |
| TEA + Decene Flow Rate (g/min) | 1.76 | 0.54 | 0.63 | 1.25 |
| Volume (g) | 610 | 520 | 150 | 270 |
| Kv100 (cSt) | 47.1 | 44.9 | 147.3 | 171.4 |
| Second Stage | | | | |
| Residence Time (hrs) | 1.06 | 0 | 4.62 | 2.32 |
| Volume (g) | 320 | 0 | 620 | 620 |
| Decene Flow Rate (g/min) | 1.51 | 0 | 0.94 | 1.89 |
| Final Product | | | | |
| Relative Productivity | 2.80 | 1.08 | 1.48 | 2.55 |
| $Kv_{100}$ (cSt) | 38.3 | 44.9 | 91.7 | 94.3 |
| Relative Cat. Used | 0.56 | 0.44 | 1.00 | 1.00 |

Example 7

Dry 1-decene was polymerized in two reaction vessels in a CSTR similar to Example 1, except the first reactor was smaller (150 grams). In the first reactor a stream comprising a mixture of IBB/dry 1-decene, having an IBB concentration of 7.56 wt %, was charged at 0.63 g/min. Also a stream comprising a mixture of TEA/dry 1-decene, having a 25%-TEA concentration of 5.53 wt %, was charged at 0.63 g/min. The residence time of first reactor was 1.98 hours. The residence time was significantly less than Example 1.

150 g of a polydecene seed having a viscosity of 100 cSt was added to the first reaction zone to activate the catalyst. The temperature of the first reactor was set to 35° C. The agitation rate of the first reactor was 400 rpm.

The effluent of the first reactor was transferred to the second reactor having a reaction mass of 620 g of mixture. Decene was added to the second reactor at 0.94 g/min. The temperature of the second reactor was 35° C. and the agitation rate of the second reactor was 400 rpm. The residence time of the second reactor was 4.62 hours. Although the absolute catalyst concentrations were high in the first reaction zone due to the dilution of decene the relative concentration in the second zone was 1.00. The concentration of catalyst was relatively larger in the initial polymerization reaction when compared to Example 1. The relative catalyst usage in the second reaction zone was 1.0, but the productivity was 1.48. The first polymer had a $Kv_{100}$ of 147.6 cSt and the final polymer product had a $Kv_{100}$ of 91.7 cSt. As a result, the size of the first reaction zone may be smaller than the second reaction zone while still improving productivity.

Figure 7:
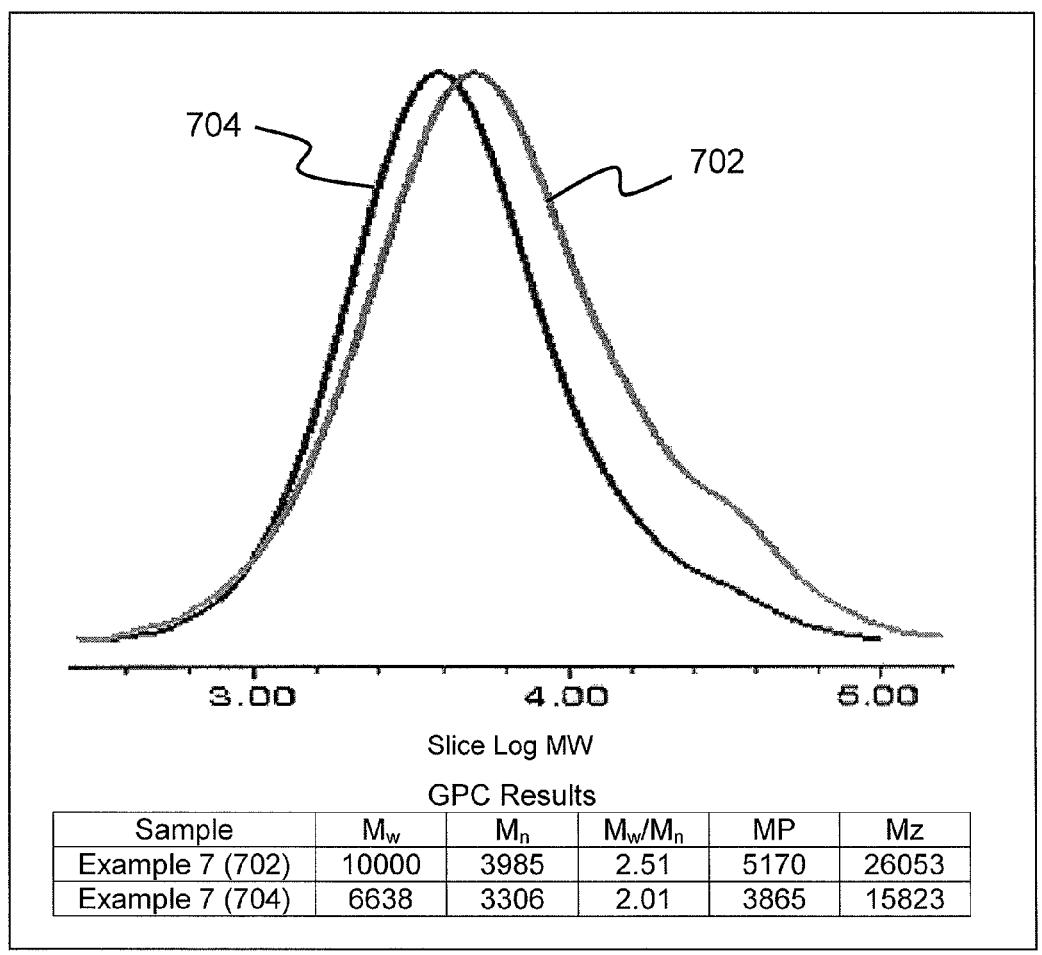
FIG. 7 is a molecular weight distribution diagram of a first polymer (702) and a final polymer product (704) formed in Example 7.

FIG. 7 is a graph showing the molecular weight distribution curve 702 as determined by gel permeation chromatograph for the first polymer (polydecene) formed in the first reaction zone and the molecular weight distribution curve 704 for the final polymer product formed in the second reaction zone. Surprisingly, the first polymer had a bimodal distribution, which suggests, without being bound by theory, two polymerization modes, possibly comprising a cationic polymerization and free radical polymerization. Potential benefits of PAO having a bimodal molecular weight distribution may include better low temperature properties (e.g., lower viscosity at lower temperatures) and better thickening efficiencies. The final polymer product exhibited a more monomodal molecular weight distribution than the first polymer.

Example 8

Dry decene was polymerized in two reaction vessels in a CSTR similar to Example 7, except the first reaction zone was larger (270 grams). The flow rates of IBB/decene and TEA/decene were doubled to 1.25 g/min., while maintaining the same catalyst concentration. 270 grams of polydecene seed was added to the first reaction zone, where the residence time was 1.80 hours. In the second reaction zone (620 grams) the residence time was 2.32 hours. The first polymer had a $Kv_{100}$ of 171.4 cSt and the final polymer product had a $Kv_{100}$ 94.3 cSt. Productivity was further increased in Example 8 to 2.55 and the relative catalyst usage was still 1.0. A larger volume in the first reaction zone resulted in higher productivity.

FIG. 8 is a graph showing the molecular weight distribution curve 802 as determined by gel permeation chromatograph for the first polymer (polydecene) formed in the first reaction zone and the molecular weight distribution curve 804 for the final polymer product formed in the second reaction zone. Again, a bimodal distribution surprisingly was observed for the first polymer.

Examples 7 and 8 illustrate a significant increase in productivity while using the same relative amount of catalyst as a single stage PAO-100 in Comparative Example A.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A process for forming a final polymer product comprising:
   (a) polymerizing a first olefin monomer in a first reaction zone in the presence of a catalyst system comprising a catalyst to form an effluent comprising a first polymer having a first viscosity and activated catalyst; and
   (b) polymerizing a second olefin monomer in a second reaction zone in the presence of the first polymer and the catalyst to form the final polymer product having a second viscosity,
   wherein the first polymer has a weight average molecular weight of from 500 to 10,000 and the final polymer product has a weight average molecular weight of from 500 to 8,000 and the final polymer product has a kinematic viscosity at 100° C. of from 20-1000 cSt.

2. The process of claim 1, further comprising the step of:
   (c) directing the first effluent or a portion thereof from the first reaction zone to the second reaction zone.

3. The process of claim 1, wherein the first olefin monomer and the second olefin monomer comprise alpha-olefin monomers having from 2 to 20 carbon atoms.

4. The process of claim 1, wherein the first olefin monomer and the second olefin monomer comprise 1-decene.

5. The process of claim 1, wherein the first olefin monomer is the same as the second olefin monomer.

6. The process of claim 1, further comprising the step of:
(d) loading a seed composition to the first reaction zone to activate the catalyst.

7. The process of claim 6, further comprising the step of polymerizing at least a portion of the first polymer in the second reaction zone in the presence of the activated catalyst.

8. The process of claim 1, wherein the second olefin monomer is only polymerized in the presence of the catalyst system in the effluent without the addition of a separate catalyst system.

9. A process for forming a final polymer product comprising:
(a) polymerizing a first olefin monomer in a first reaction zone in the presence of a catalyst system comprising a catalyst to form an effluent comprising a first polymer having a first viscosity and activated catalyst; and
(b) polymerizing a second olefin monomer in a second reaction zone in the presence of the first polymer and the catalyst to form the final polymer product having a second viscosity,
wherein the first polymer has a weight average molecular weight of from 4,000 to 10,000 and the final polymer product has a weight average molecular weight of from 2,500 to 9,000 and the final polymer product has a kinematic viscosity at 100° C. of from 70 to 140 cSt.

10. The process of claim 1, wherein the final polymer product has a weight average molecular weight that is at least 50% less than the first polymer.

11. The process of claim 1, wherein first polymer has a kinematic viscosity at 100° C. of from 20 to 500 cSt.

12. The process of claim 1, wherein final polymer product has a kinematic viscosity at 100° C. of from 20 to 60 cSt.

13. The process of claim 1, wherein the final polymer product has a kinematic viscosity at 100° C. of from 70 to 140 cSt.

14. The process of claim 1, wherein the first viscosity is greater than the second viscosity.

15. The process of claim 1, wherein the first viscosity is substantially equal to the second viscosity.

16. The process of claim 1, wherein the molar ratio of the first olefin monomer to the second olefin monomer is from 4:1 to 1:4.

17. The process of claim 1, wherein the first reaction zone is heated to a first temperature of from 25 to 45° C.

18. The process of claim 1, wherein the second reaction zone is heated to a second temperature of from 30 to 55° C.

19. The process of claim 1, wherein the residence time in the first reaction zone is from 1 to 15 hrs.

20. The process of claim 1, wherein the residence time in the second reaction zone is from 0.25 to 7 hrs.

21. The process of claim 1, wherein the ratio of the residence time in the first reaction zone to the residence time in the second reaction zone is from 1:4 to 4:1.

22. The process of claim 1, wherein the catalyst system comprises an alkyl-halide and an alkyl-aluminum.

23. The process of claim 1, wherein the catalyst system comprises isobutyl bromide and triethylaluminum.

24. The process of claim 1, wherein the process is a continuous process.

25. The process of claim 9, further comprising the step of:
(c) directing the first effluent or a portion thereof from the first reaction zone to the second reaction zone.

26. The process of claim 9, wherein the first olefin monomer and the second olefin monomer comprise alpha-olefin monomers having from 2 to 20 carbon atoms.

27. The process of claim 9, wherein the first olefin monomer and the second olefin monomer comprise 1-decene.

28. The process of claim 9, wherein the first olefin monomer is the same as the second olefin monomer.

29. The process of claim 9, further comprising the step of:
(d) loading a seed composition to the first reaction zone to activate the catalyst.

30. The process of claim 9, further comprising the step of polymerizing at least a portion of the first polymer in the second reaction zone in the presence of the activated catalyst.

31. The process of claim 9, wherein the second olefin monomer is only polymerized in the presence of the catalyst system in the effluent without the addition of a separate catalyst system.

32. The process of claim 9, wherein the catalyst system comprises an alkyl-halide and an alkyl-aluminum.

* * * * *